United States Patent [19]
Lowe et al.

[11] Patent Number: 5,531,024
[45] Date of Patent: Jul. 2, 1996

[54] METHOD OF MAKING A FULL FACE WHEEL

[76] Inventors: Danny E. Lowe; Kevin D. Jurus, both of 4000 Collins Rd., Lansing, Mich. 48910

[21] Appl. No.: 221,063

[22] Filed: Mar. 31, 1994

[51] Int. Cl.$^6$ ................................................ B21K 1/28
[52] U.S. Cl. ................................ 29/894.323; 301/63.1
[58] Field of Search ................ 29/894.322, 894.323, 29/894.324, 894.325; 301/63.1; 72/105, 106, 107, 110

[56] References Cited

U.S. PATENT DOCUMENTS

| | | |
|---|---|---|
| 3,077,130 | 2/1963 | Johnson et al. . |
| 3,091,202 | 5/1963 | Mackey . |
| 3,364,550 | 1/1968 | Jessee et al. . |
| 4,280,426 | 7/1981 | Swan . |
| 4,606,206 | 8/1986 | Daudi . |
| 4,610,482 | 9/1986 | Overbeck et al. . |
| 4,825,675 | 5/1989 | Shinozawa et al. . |
| 4,848,125 | 7/1989 | Itou et al. . |

OTHER PUBLICATIONS

Metals Handbook–vol. 4, p. 182.
SAE Paper SP897–pp. 41–49–Feb. 1992.

*Primary Examiner*—P. W. Echols
*Attorney, Agent, or Firm*—Barnes, Kisselle, Raisch, Choate, Whittemore & Hulbert

[57] ABSTRACT

A full face fabricated sheet metal wheel having a rim with dual bead seats and inboard flange and a disc welded to the outboard edge of the rim and providing an outboard tire bead retaining flange with a curl rolled to finish profile without machining. Method and apparatus for making such wheel includes a roll forming machine with modified roll forming tooling and workpiece clamping mechanism so as to rotatably spring clamp and rotationally drivingly support a wheel workpiece in the machine roll forming station on axially opposed outboard and inboard power driven lower rolls during roll forming the flange curl profile. An upper outboard roll operates to first clamp a flange pre-cursor portion of the workpiece to securely stabilize and prevent tilting of the workpiece on the lower clamping support rolls and then by further successive roll forming engagement cause cold flow of the flange metal to thin and iron the flange curl to finished profile. Flange curl outside diameter is controllable by adjusting angular orientation of the workpiece rotational axis relative to the roll rotational axes, as by controlling relative diameters of the support rolls and/or relative elevations of the rotational axes of the lower rolls. "Full face" clamping of the workpiece by the opposed inner rolls further supports the workpiece against tilting forces during initial roll forming as well as during edge conditioning roll forming performed concurrently in the roll forming station.

26 Claims, 10 Drawing Sheets

|   | BEGIN |  | END |  |
|---|---|---|---|---|
|   | X | Y | X | Y |
| A. | 0.000 | 0.000 | 0.000 | 3.958 |
| B. | 0.125 | 3.958 | .125 | R |
| C. | 0.037 | 4.046 | 3.167 | 7.176 |
| D. | 2.990 | 7.353 | .250 | R |
| E. | 3.199 | 7.216 | 3.507 | 7.688 |
| F. | 3.612 | 7.620 | .125 | R |
| G. | 3.632 | 7.743 | 3.705 | 7.731 |
| H. | 3.709 | 7.756 | .025 | R |
| I. | 3.825 | 7.625 | .150 | R |
| J. | 3.750 | 7.558 | .250 | R |
| K. | 4.000 | 7.558 | 4.000 | 0.000 |

(DIMENSIONS IN INCHES)

| | BEGIN | | END | |
|---|---|---|---|---|
| | X | Y | X | Y |
| A. | 0.000 | 0.000 | 0.000 | 3.933 |
| B. | 0.125 | 3.933 | .125 | R |
| C. | 0.037 | 4.022 | 3.167 | 7.151 |
| D. | 2.990 | 7.328 | .250 | R |
| E. | 3.199 | 7.191 | 3.477 | 7.617 |
| F. | 3.624 | 7.521 | .175 | R |
| G. | 3.624 | 7.696 | 3.815 | 7.696 |
| H. | 3.815 | 7.511 | .185 | R |
| I. | 4.000 | 7.511 | 4.000 | 0.000 |

| | BEGIN | | END | |
|---|---|---|---|---|
| | X | Y | X | Y |
| A. | 0.000 | 0.000 | 0.000 | 1.341 |
| B. | 0.090 | 1.341 | .090 | R |
| C. | 0.151 | 1.406 | 0.272 | 1.294 |
| D. | 0.315 | 1.340 | .063 | R |
| E. | 0.376 | 1.323 | 0.418 | 1.478 |
| F. | 0.477 | 1.470 | .030 | R |
| G. | 0.447 | 1.500 | 1.000 | 1.500 |

METHOD OF MAKING A FULL FACE WHEEL

FIELD OF THE INVENTION

This invention relates to vehicle wheels of the so-called "full face" fabricated sheet metal type for use in various types of automotive passenger vehicles such as passenger cars, sport utility vehicles, vans and light trucks, and more particularly to improvements in the construction of the disc outboard flange of such full face wheels and in method and apparatus for making the same.

BACKGROUND OF THE INVENTION

Efforts to enhance the appearance of automotive wheels have resulted in the development of the so-called "full face" fabricated sheet metal (e.g., steel) styled wheel, initiated in the 1980's by Motor Wheel Corporation, assignee of applicant herein, wherein the disc is a fabricated sheet metal part that extends generally radially outwardly around its outer periphery to also form the outboard tire bead retaining flange to achieve the full face appearance. A modified rim having dual bead seats but only a single, inboard tire-bead-retaining flange is separately fabricated from sheet metal, and the outboard rim free edge is formed to provide a radially in-turned flange which is welded to the inboard face of the full face disc part to permanently join the disc and rim parts in assembly. A commercially successful example of such a full face wheel is that disclosed and claimed in Overbeck et al U.S. Pat. No. 4,610,482, also assigned to the assignee herein.

As is well understood in the art, economical high volume manufacture of the disc part of disc-type fabricated sheet metal wheels, whether of the base or full face type, utilizes progressive die forming transfer press tooling and associated fixtures. Many forming stages as well as subsequent manufacturing operations are often employed to transform the flat circular sheet metal starting blank into the various configurations, contours and openings involved in providing the central bolt circle wheel mounting portion of the disc, the "window" or "beauty-section" of the disc which extends radially outwardly of the wheel from the center mounting portion, and, in the case of the aforementioned '482 patent type full face disc wheels, the reversely curved outer edge portion which forms the outboard tire bead retaining flange portion of the disc.

The other of the two main component parts of the aforementioned '482 patent-type full face wheel, namely the inboard rim part, has been separately made from the disc in a distinct and substantially different manufacturing process from that utilized in making the disc. Although each of these parts is constructed from uniform thickness sheet metal starting materials (such as plain carbon or high strength alloy steels, or less commonly, from aluminum and magnesium alloy sheet metal materials) the thickness of the full face disc starting material typically is almost twice that used for making the rim (e.g., about 0.200 inches versus about 0.100 inches in the case of steel alloys).

The rim part for the full face wheel is made by employing known rim making processes and apparatus. Some examples of such prior art rim rolling and edge conditioning processes and apparatus are disclosed in U.S. Pat. Nos. 3,077,130; 3,091,202; 3,364,550; 4,606,206; 4,825,675 and 4,848,125. The flat strip stock is first coiled and butt welded to form a cylindrical hoop, and then the inboard edge of the hoop is flared outwardly. The flared hoop is then subjected to a rolling operation to form, slightly undersize, the finished rim contour including the drop center well, inboard and outboard tire bead seats, associated safety humps and inboard tire bead retaining flange. The radially inwardly-curled outboard edge of the rim is formed in a final stage of the rim rolling operation by a specially formed roll and curling die or shoe. The rim is then subjected to a final sizing or truing operation in which the rim is expanded by segmental dies so as to be stretched to take a permanent set at a final size. Typically the starting thickness of the sheet material for the single flange rim part of the full face wheel is generally the same as that utilized in making base wheels having dual-flange rolled rims, generally on the order of 0.100 inches, and depending, of course, on the specified wheel material, size and load rating.

The disc part of the full face wheel is manufactured utilizing the aforementioned standardized disc making processes and apparatus which, like base wheel discs, generally involve die cutting the flat blanks from the sheet metal starting material and processing such blanks through multiple stage progressive die tooling in high speed transfer press equipment. For example, as many as eight or more stages may be required in the disc forming transfer press, e.g., (1) draw, (2) reduce, (3) form center and face, (4) trim O.D., (5) form edge, (6) pierce vent and medallion holes, (7) pierce bolt and center hole and (8) coin vent backside. See for example SAE Paper SP-897 entitled "Autobody Stamping Applications and Analysis" published February, 1992, pages 41–49, and in particular pages 47 and 48 thereof, as well as Swan U.S. Pat. No. 4,280,426, and *Metals Handbook,* 8th Edition, Vol, 4, pp. 182 (FIG. 48), published by the American Society for Metals (1969).

Due to the basic structural differences between a full face wheel construction of the aforementioned Overbeck et al type as compared to the conventional base wheel construction additional processing steps are employed in making the full face wheel disc part. In the rim part of a conventional base wheel assembly, the inboard and outboard rim flanges are both roll formed and shaped to final configuration in the aforementioned rolling operations from the same uniform thickness sheet material starting stock. Hence both flanges may be readily made to the same specified contour, thickness and other dimensional parameters to meet established Tire and Rim Association specifications for various standardized rim flange types such as "J, JP, JJ, and K" (which pertain to the rim flange contour on the tire side of the flange). Since the inboard and outboard flanges have essentially the same contour and thickness, the same type and size of wheel balance weight may be readily attached to either or both of these flanges.

By contrast, with a full face wheel construction the outboard flange is part of and integral with the disc part and therefore is substantially different from the roll-formed rim inboard flange. The final form which can be imparted to the outboard flange is thus limited by the characteristics of the wheel disc and the disc making operation as distinguished from the rim forming operations. Since the disc starting material generally must be substantially thicker than that of the rim stock, the disc outboard flange in its "as-stamped" condition likewise will be substantially thicker than the rim inboard flange. Also, it is not economically feasible in the progressive die forming operation to impart the required tire-side curvature to the outboard disc flange portion. Hence, in addition to being substantially thicker than the rim inboard flange, this disc outboard flange pre-form portion will generally have a radially outwardly flaring taper (relative to the wheel axis) as final formed in the disc making operation.

Accordingly, further rough and finish machining operations hitherto have been required on the disc to bring the disc outboard flange to the appropriate dimensions and configuration required to meet TRA specifications, as well as to satisfactorily accept and retain standardized wheel balance weights which can fit either or both of the inboard and outboard wheel flanges. The "as-stamped" disc full face part thus has been further processed in a pre-assembly machining operation in which the outer edge of the flange pre-form portion is first machined off to a predetermined "flange length" as a rough cut-out operation. This also removes most, if not all, undulations and other variations in the as-stamped pre-form flange circumferentially of the disc which may have been imparted in the progressive die forming operation.

In the next pre-assembly step, a further and final machining operation is performed in which the rough-cut disc outboard flange (in its die-made preform condition) is lathe form cut in a vertical axis lathe to impart the Tire and Rim Association specified tire side dimensions and configuration as well as suitable standard balance weight attachment contour. Typically, this has involved sequential lathe operations in which a form cutting tool first machines the radially outwardly facing inboard surface of the disc outboard flange to establish the required rim flange contour on the tire side. This operation has then been followed by a second form cutting tool operation to machine the radially inwardly facing outboard surface of the rim flange so that the final contour of the machined disc flange "curl", i.e., the outboard, radially inwardly facing contour in conjunction with the tire-side contour, is also suitable for accepting one of the standardized types of wheel balance weights.

The disc part, with the outboard flange so pre-machined, has then been fixtured to the rim part and welded thereto as set forth previously to initially form the two part full face wheel assembly. At this stage, or preferably in a following "pierce-after" operation, the geometric relationship of the finished dual rim bead seats and inboard rim flange are established radially relative to the wheel mounting openings, i.e., the mounting bolt holes and center pilot hole of the disc, as well as laterally relative to the central mounting plane of the disc. After this last metal working operation has been completed the full face wheel assembly is then ready for further processing in final conventional wheel coating operations such as painting, plating, etc.

As has been well understood by those skilled in the wheel making art, the aforementioned pre-assembly and after-assembly machining operations on the outboard disc flange represent additional manufacturing costs in terms of additional equipment and process operations which in turn increase the manufacturing costs of full face wheels relative to conventional base wheels. Accordingly there has been a well recognized need for many years to somehow reduce or eliminate such pre-assembly disc outboard flange machining operations to thereby reduce the as-manufactured cost of such full face wheels.

One prior art approach considered by the inventors herein to possibly solving some aspects of this problem is that represented by the prior manufacture, by the assignee of the inventors herein, namely Motor Wheel Corporation of Lansing, Mich., of the so-called "Hollywood" type fabricated sheet metal full face styled wheels as produced commercially from the early 1960's until the late 1980's for rear wheel drive vehicles. Such a wheel is illustrated on page 26 of the April, 1965 issue of *Motor Trend* magazine and in FIG. 48 of the aforementioned *Metals Handbook* citation.

In the construction of this different type of full face wheel, as well as its manufacture as practiced commercially, the outboard bead seat and outboard flange were both made as die stamped preform areas in the disc, and then conjointly roll formed after welded assembly of the disc preform to a half rim inboard part. Suffice it to say at this point that, due to the differences in construction of this early type of fabricated full face wheel relative to the aforementioned Overbeck et al type, as well as the industry standards then prevailing as to balance weight attachment (inboard flange only), the processing techniques and equipment employed to produce such Hollywood wheels have not been found to be a satisfactory solution to eliminate the need for the aforementioned outboard flange machining operations.

OBJECTS OF THE INVENTION

Accordingly, an object of the present invention is to provide an improved method, and improved apparatus for performing the same, which enable the production of an improved Overbeck et al full face type wheel in a more reliable and economical manner to thereby impart the final TRA specified contour to the outboard flange of the wheel.

Another object is to provide an improved method and apparatus of the aforementioned character which eliminates the need for the aforementioned pre-assembly lathe machining operations on the outboard flange portion of the disc part.

A further object is to provide an improved method and apparatus of the aforementioned character which can be adapted to impart an optimal final shape, contour and finish to the outboard disc flange curl by a roll forming and cold working operation while also eliminating the need for any machining, grinding or polishing of the outboard flange of the disc subsequent to assembly to the rim.

Still another object is to provide an improved full face wheel construction of the aforementioned character with enhanced product characteristics as a result of processing by the improved method and apparatus of the present invention and that can satisfactorily accept and retain standardized wheel balance weights which are "universal", i.e., fit either or both the rim inboard flange and disc outboard flange.

BRIEF DESCRIPTION OF THE DRAWINGS

The foregoing objects as well as other objects, features and advantages of the present invention will become apparent from the following detailed description, claims and appended drawings (which are to scale unless otherwise noted) wherein:

GENERAL DESCRIPTION OF ROLL FORMING MACHINE UTILIZED IN PRACTICING THE INVENTION

Figure 1:
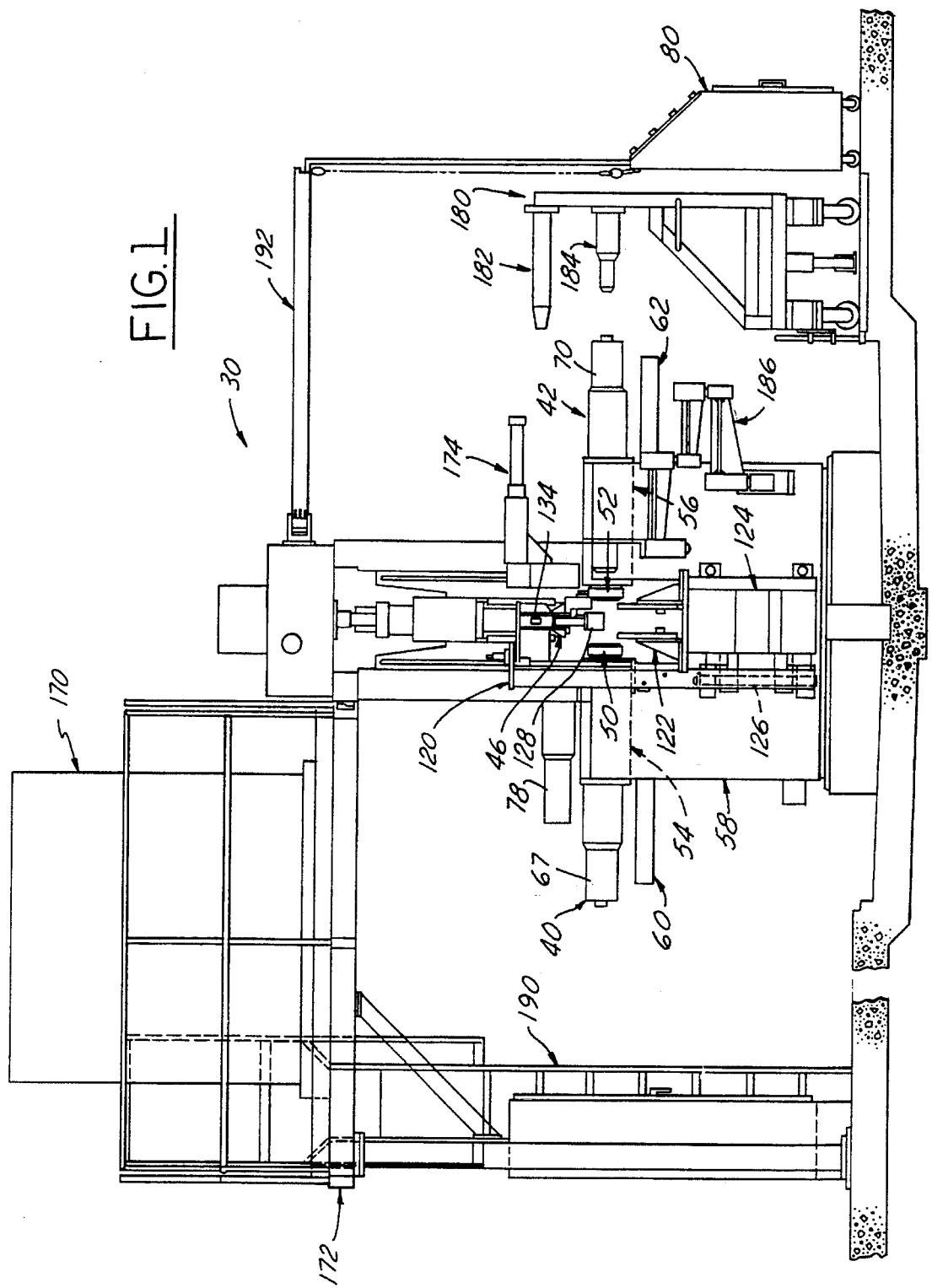
FIG. 1 is a front elevational view, in somewhat simplified schematic form, of a roll forming machine provided in accordance with the present invention and presently preferred as the best mode for practicing the method of the invention for final forming of the wheel outboard flange "curl".
Figure 2:
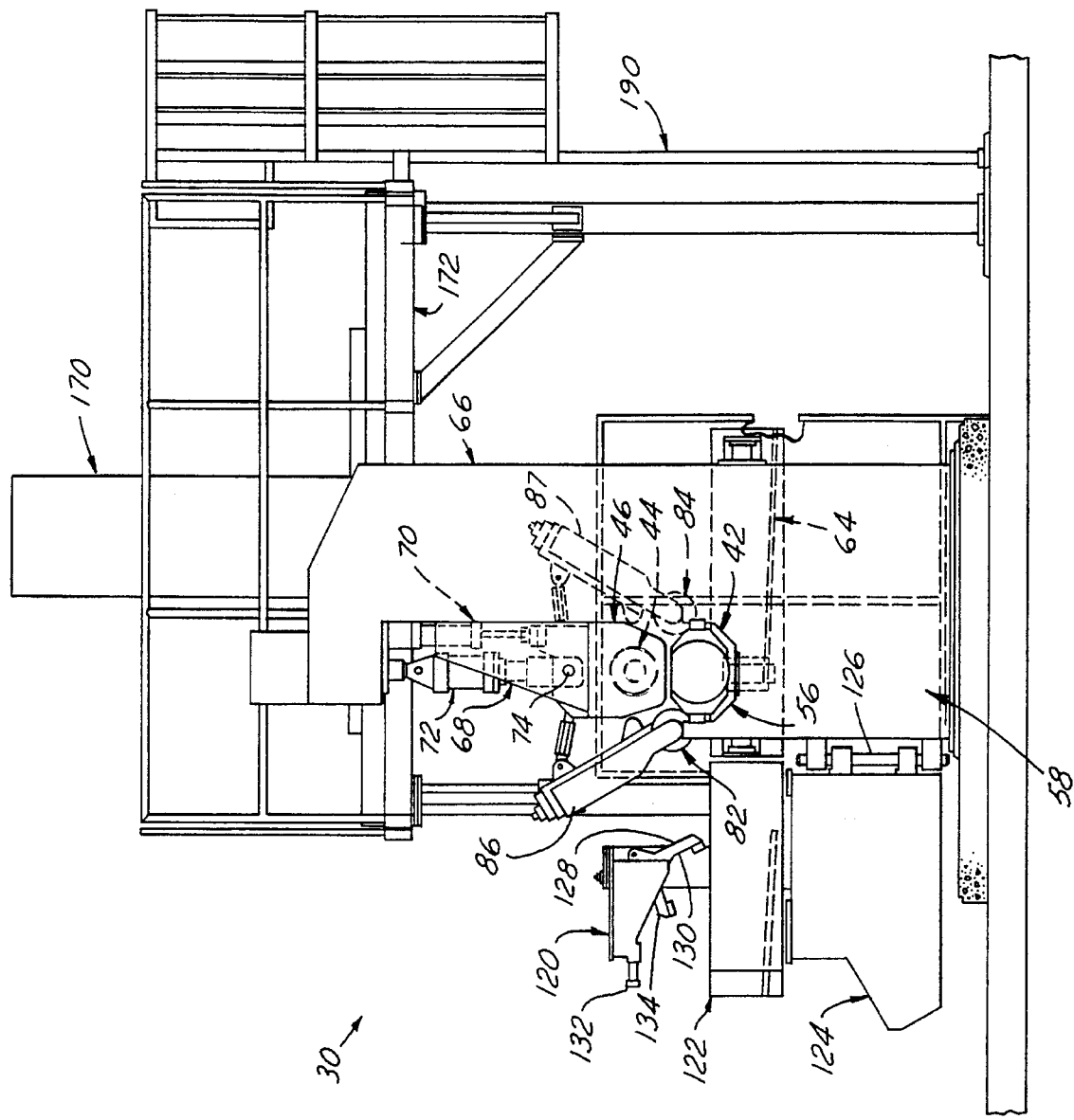
FIG. 2 is a side elevational view of the machine of FIG. 1.
Figure 3:
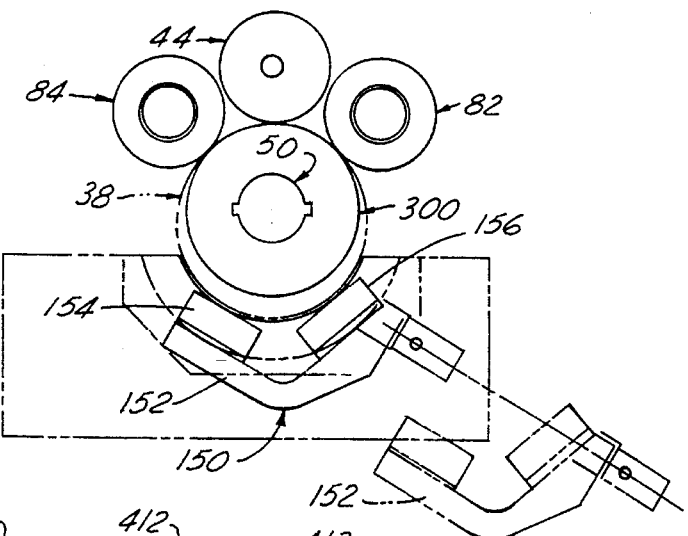
FIG. 3 is a side elevational diagramatic illustration of the forming rolls, guide rolls and wheel workpiece loading mechanism of the machine of FIGS. 1 and 2.

Referring to FIGS. 1–4, the roll forming method and tooling of the invention utilized to impart a finished cross sectional profile to the outboard flange of a welded, full face wheel of the aforementioned type is preferably accomplished in a conventional horizontal axis, automatically controlled, roll former apparatus 30 illustrated in conjunction with associated roll form station equipment in FIGS. 1 and 2. In general, roll former 30 is designed to impart the finished cross sectional profile to an as-stamped outboard flange pre-cursor 32 on a welded full face wheel assembly workpiece 38 (FIG. 8) comprising a progressive die formed full face disc 34 and a single-flange, dual-bead-seat rim 36, thereby providing as input to machine 30 a wheel workpiece 38 as hitherto made in accordance with the aforementioned Overbeck et al U.S. Pat. No. 4,610,482 prior to the final outboard flange machining operation. Wheel workpiece 38 is placed between two horizontally opposed inner outboard and inboard rolls 300 and 302 respectively mounted on lower spindle drives 40 and 42 of machine 30 (FIG. 1) and which close to begin rotating the wheel workpiece 38. Outer roll tooling 44, provided in accordance with the present invention, (FIG. 4), and located on the upper spindle assembly 46 of machine 30, is brought into contact with the workpiece 38 (FIG. 4), and operated to roll form the workpiece flange precursor portion 32 into a "curl" profile onto the full face flange of the wheel workpiece. An edge conditioning spindle attachment 48 (FIG. 4) is also provided in machine 30 which is positioned for contact with the outboard flange as it is being roll formed, thereby conditioning the free edge of the flange curl.

Figures 18, 19:
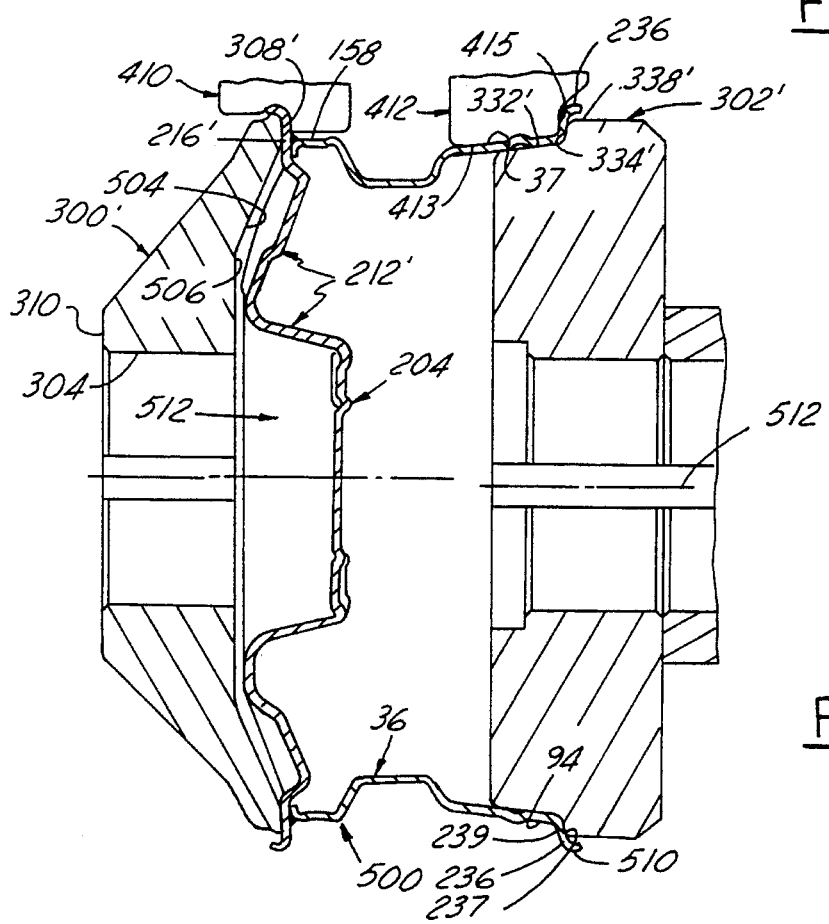
FIG. 18 is a gant chart illustrating a working example of the machine major motions and illustrated timing and sequence of the same in performing the method of the invention.
FIG. 19 is a vertical center sectional view of a second embodiment of an inboard and outboard inner (or lower) rolls of the invention employed in the apparatus of FIGS. 1 and 2 for performing the method on a full face wheel workpiece provided with a disc having an outboard-protruding styling configuration.

More particularly, the two lower spindles 50 and 52 of spindle drives 40 and 42 respectively are mounted horizontally on associated slides 54 and 56 (slide 54 indicated diagramatically in FIG. 1, and slide 56 shown in FIG. 2), located and suitably supported one at each side of the base 58 of machine 30. Slides 54 and 56 are operably connected to a single hydraulically driven linkage (not shown) mounted in base 58 and driven by hydraulic rams 60 and 62 operating in unison. The slide drive linkage is operated to advance spindles 50 and 52 simultaneously towards one another to clamp and rotate workpiece 38 during the roll forming work cycle (FIG. 18). The spindle slide toggle drive linkage then is operated to retract spindles 50 and 52 to allow the spinning and finished wheel workpiece 38 to drop from between the spindle tooling. Workpiece 38 then exits the roll forming machine 30 by dropping onto and rolling down an inclined exit chute, running from below the work station rearwardly of the main frame 66 of machine 30, and out the rear of machine 30 to suitable conveying apparatus (not shown). Spindles 50 and 52 are driven by hydraulic motors 67 and 70 respectively which are hydraulically connected in series to achieve the desired rpm relationship with the drive for upper spindle 46.

The upper profile tooling 44 (FIG. 4) is mounted on the single upper spindle 46, which in turn is horizontally mounted (for rotation about a horizontal axis) on a vertically movable slide (not shown) which in turn is movably mounted on a carriage 68 (FIG. 2). Carriage 68 is slidably guided on the main frame 66 of machine 30 and raised and lowered by a hydraulic ram 70 to adjust the vertical position of the carriage. A larger hydraulic ram 72 is connected between frame 66 and a shaft 74 coupled to the slide on carriage 68 operable for advancing spindle 46 downwardly to drive the profile tooling 44 against the rotating wheel workpiece 38. Shaft 74 may be raised or lowered by ram 70 in order to deposition the upper spindle 46 for different size wheel workpieces. The upper spindle 46 is also driven by a hydraulic motor 78 (FIG. 1) supported on the carriage slide. The amount of "ironing" time during the dwell phase (FIG. 18) of the work cycle is adjustable by suitable conventional electronic control equipment including a control panel 80 (FIG. 1) to compensate for different diameter wheels.

Two non-powered side guide rollers 82 and 84 (FIGS. 2 and 3) are mounted on the lower free ends of pivotally mounted support arms 86 and 87 (FIG. 2) with their respective spindles yieldably biased by air springs (not shown) contained within supports 86 and 87. Guide roller 82 is located in front of upper spindle 46 and guide roller 84 behind the upper spindle. During the roll forming cycle, rollers 82 and 84 are brought into contact with the "long-leg" portion 88 of the rim 90 of workpiece 38 (FIG. 8), i.e., between the drop center well 92 and inboard bead seat 94 of rim part 90, and just after inner rolls 300 and 302 on lower spindles 40 and 42 have reached their fully advanced, clamping position on workpiece 38 and prior to engagement of the upper spindle tooling with the workpiece. Guide rollers 82 and 84 function as shock absorbers to prevent oscillations of workpiece 36 while it is rotating. Guide rollers 82 and 84 are swung away from work engaging position concurrently with initiation of the "raise upper spindle" cycle phase (FIG. 18).

The edge conditioning attachment 48 (FIG. 4) is located under the outboard lower spindle 40 and mounted on a carriage 100 which pivots on a pin 102 and is actuated by a hydraulic ram (not shown) suitably controlled by an automatic control system 80. Edge conditioner 48 carries an edge conditioning roll 104, described in more detail hereinafter, which is non-powered and free to slide with limited axial movement on its spindle journal bearings (not shown) under the yieldable restraint of a pair of opposed centering springs (not shown). Edge conditioner roll 104 is brought into edge rolling position after the ironing cycle is begun ("dwell" in FIG. 18), and is retracted from edge rolling position before the ironing cycle is completed. The amount of edge conditioning time can be adjusted by suitable input to the automatically controlled system 80.

A part loader mechanism 120 and associated entry chute 122 is mounted on a swingable stand 124 at the entry side of the roll forming machine base 58 (FIGS. 1 and 2) by a hinge pin 126. Chute 122 accepts wheel workpieces 38 which roll thereinto from a previous manufacturing operation and are individually caught and held by the stop arm 128 of a pivoted bell crank 130 actuated by a ram 132. Each wheel workpiece 38 is trapped by arm 128 and held stationarily until machine 30 is ready for processing another wheel workpiece 38. Crank arm 130 is then actuated to raise stop arm 128 and lower a kicker arm to thereby release the workpiece and kick it into a loading fork mechanism 150 (FIG. 3) as part of the machine cycle sequence.

Loading fork mechanism 150 is mounted below and slightly in advance of the machine roll forming station within base 58, and includes a fork arm 152 carrying a pair of angled support pads 154 and 156 suitably profiled to support and engage a workpiece 38, between the inboard bead seat 94 and outboard bead seat 158 of rim 36, to craddle the workpiece in a rest position thereon. Fork 150 is attached to a hydraulic cylinder 160 which, when advanced from the workpiece receiving position shown in phantom in FIG. 3 to the solid line position shown in FIG. 3, carries workpiece 38 diagonally upwardly to a position between the inner rolls 300 and 302 of lower spindles 40 and 42. Loader 150 is retracted after the completion of the advance motion of spindles 40 and 42 and prior to the engagement of the upper tooling 44 with the workpiece, as indicated in more detail in the machine cycling portrayed in the gant chart of FIG. 18.

Roll forming machine 30 is powered by a hydraulic power unit 170 located on an adjacent overhead platform 172. Power unit 170 includes three separate hydraulic pumps (not shown) provided to power the machine spindles 46, 50 and 52, a tool change cylinder 174 (FIG. 1) and other general hydraulic functions of machine 30. Power unit 170 includes a suitable hydraulic fluid reservoir and associated hydraulic fluid filtering and cooling apparatus of conventional construction. Preferably all of the critical slides, bearings and joints of machine 30 are lubricated by an automatic centralized grease lubrication system in accordance with known practices. Likewise, the air supply to the roll forming machine 30 is regulated, filtered and lubricated in accordance with known practice to prevent damage from corrosion.

Although not forming part of the present invention, roll forming machine 30 also is preferably provided with quick tool change apparatus. The outer bearing (not shown) for the upper spindle 46 can be retracted and rotated by the hydraulic cylinder 174, thereby facilitating access for removal of the upper tooling 44. A tool change cart 180 (FIG. 1) provided with tool change arms 182 and 184 facilitates removal and replacement of the upper and lower spindle tooling. A tool change swing arm support 186 is also preferably provided as an attachment to machine base 58 for carrying and swinging lower spindle tooling during tooling change operations. Likewise, the entire part loader mechanism 120, 122 and 124 can be unlocked from the base 58 of the frame of machine 30 and pivoted 90° from its normal operating position to thereby swing it aside during tool change procedures.

It is to be understood that the construction, arrangement and general mode of operation of roll forming machine 30 as thus far described represents a conventional, albeit state of the art, commercially available machine such as that manufactured by Hess Engineering, Inc. of Niles, Mich. and identified as H-FRH-3 Rollformer With Edge Conditioning, with H-AZF-3 Standard Part Loader. Nevertheless machine 30 has been so disclosed hereinabove as representative of the best mode of general roll forming apparatus presently known for use in practicing the method of the invention, and for utilizing the novel improvement tooling and apparatus features for modifying machine 30 in performing the method to thereby accomplish the aforementioned objects in accordance with the invention, as described in more detail hereinafter.

DETAILED DESCRIPTION OF PREFERRED EMBODIMENTS OF THE INVENTION

Figure 4:
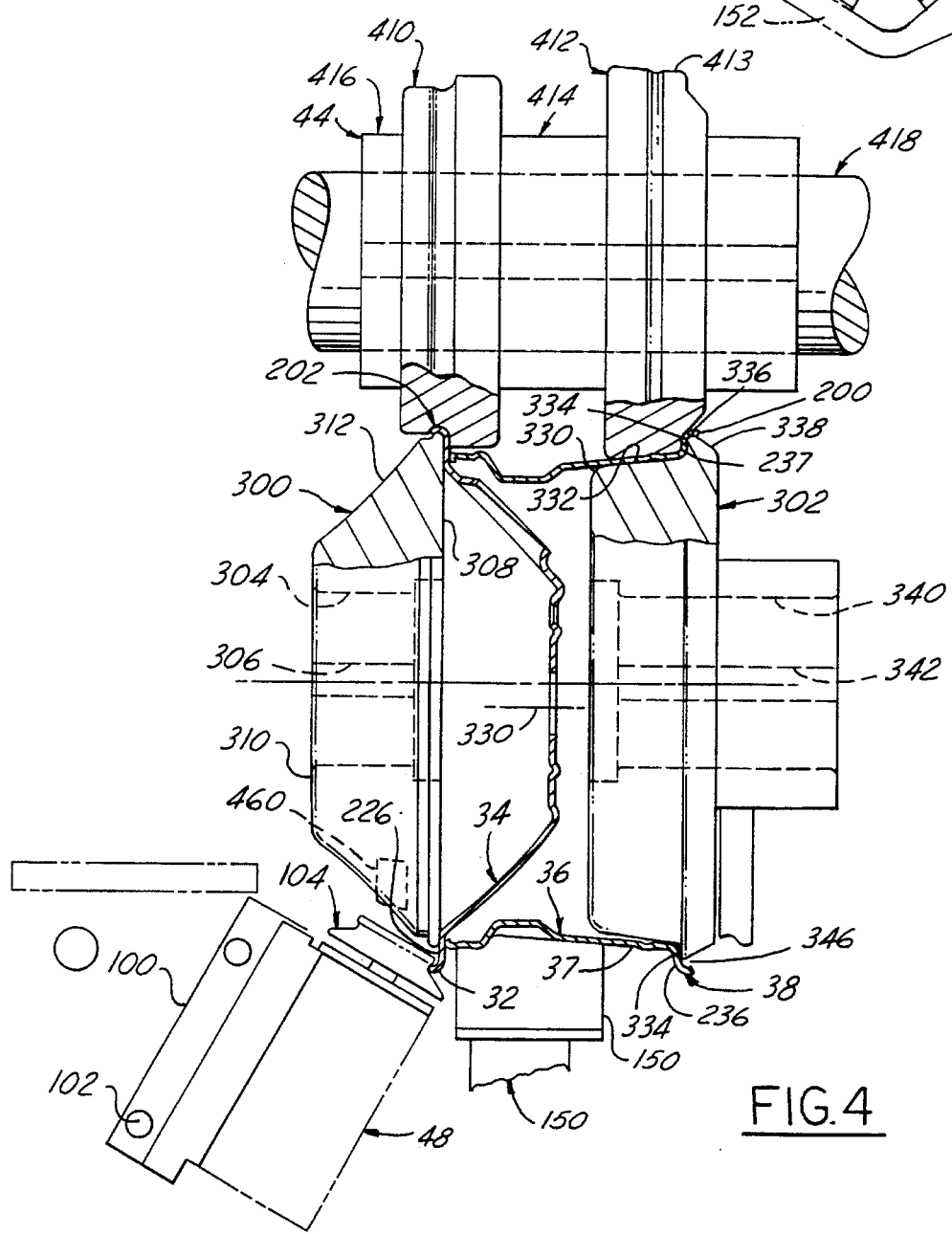
FIG. 4 is a part sectional, part elevational view of a first embodiment of the roll form and edge conditioning tooling of the invention employed in the apparatus of FIGS. 1 and 2, with portions broken away in central section.

In accordance with one embodiment of the invention, a full face sheet metal fabricated wheel construction 200, having a fully finished outboard flange curl 202 as made by the method and apparatus improvements of the present invention is illustrated in cross section in the upper half portion of the workpiece 38 illustrated in FIG. 4. The lower half of the cross sectional view of workpiece 38 illustrated in FIG. 4 shows its cross sectional contour prior to entry into machine 30, and corresponds to the workpiece complete cross sectional contour illustrated in FIG. 8.

Figure 8:
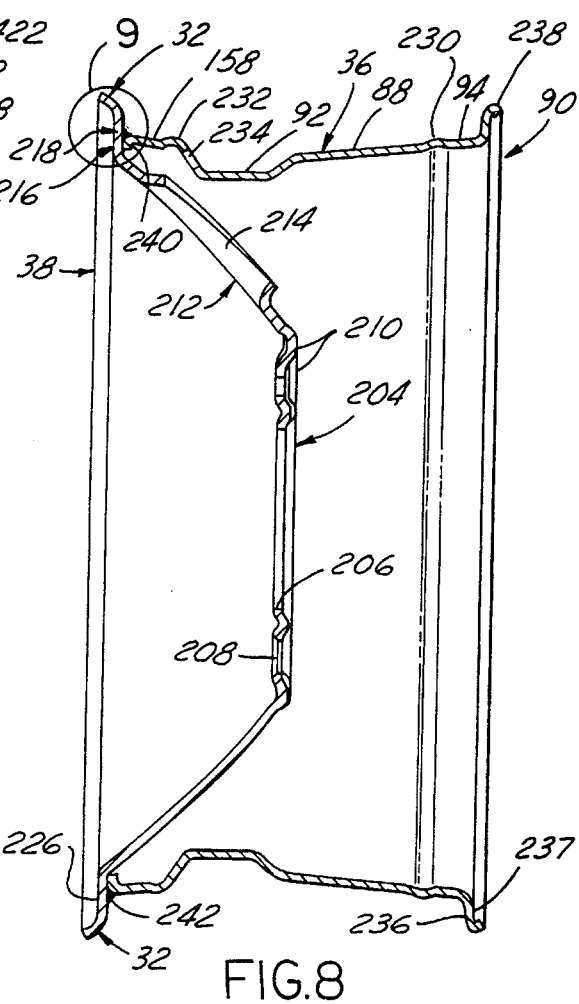
FIG. 8 is a vertical center sectional view of the disc and rim parts shown in assembled relation after welding to provide the wheel workpiece, but prior to the final roll forming of the outboard disc flange curl, the disc part thus being shown in its final as-stamped condition with a precursor outboard flange portion circled at "A".
Figure 10A:
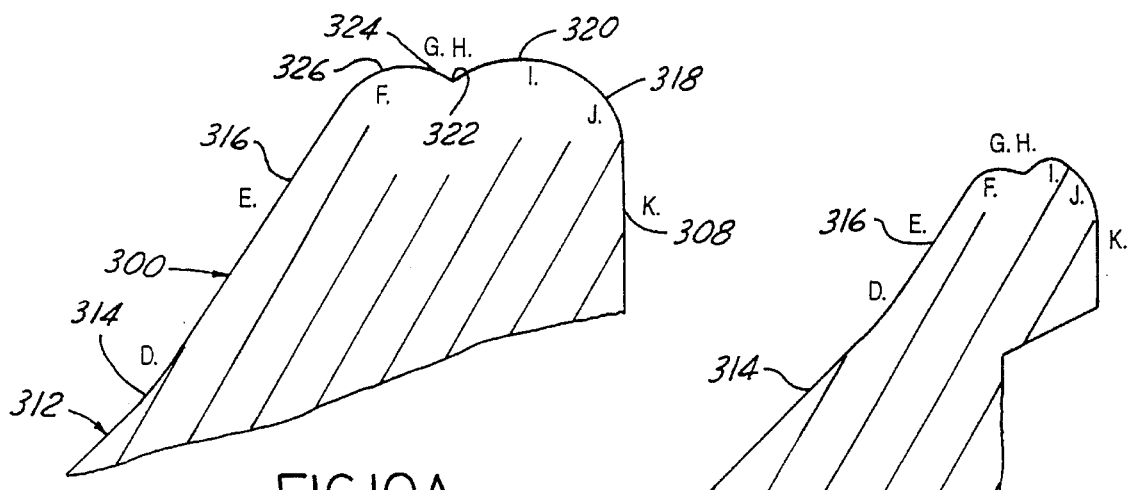
FIG. 10A is a fragmentary cross sectional view, with plot points thereon, of a portion of the outboard inner roll shown in FIG. 9 but enlarged thereover.
Figure 10:
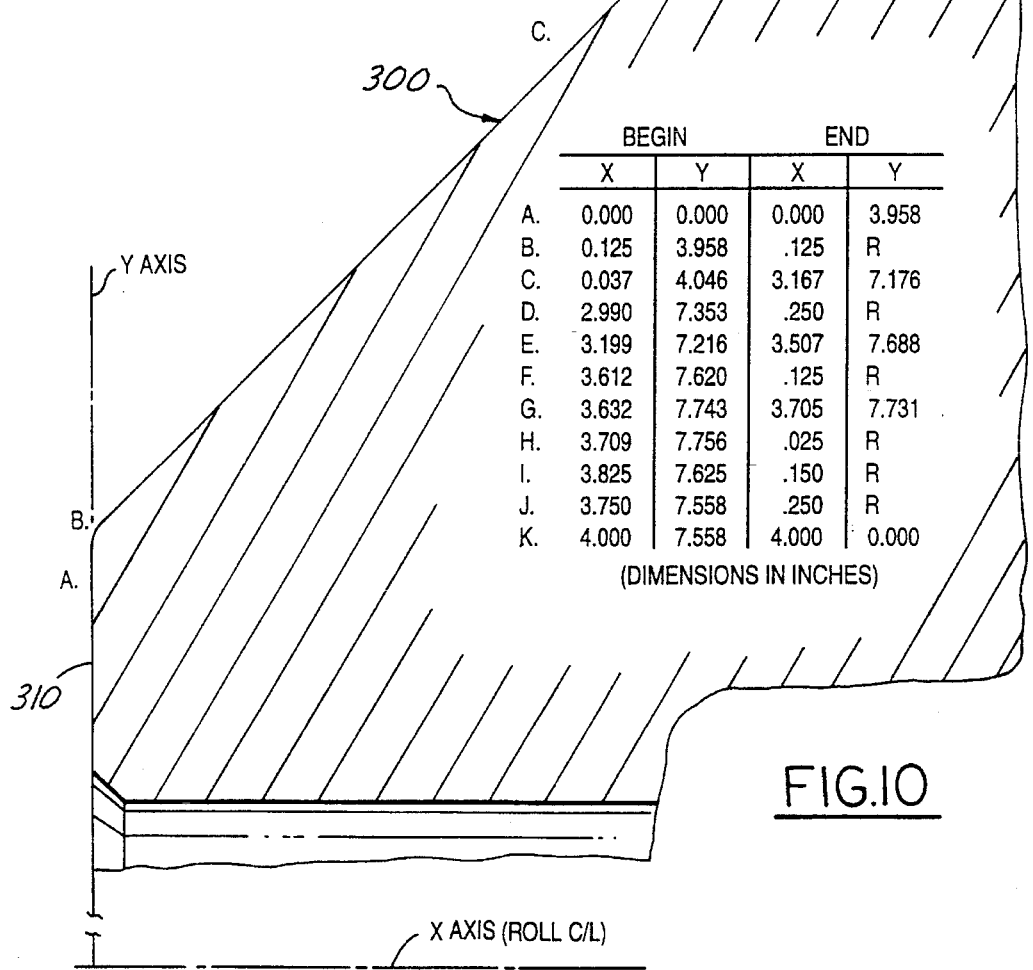
FIG. 10 is a fragmentary cross sectional view of a portion of the outboard inner roll shown in FIG. 4 with dimensional coordinates illustrated thereon to delineate the cross sectional profile of this back-up forming roll in one working example thereof.

The first step in the method of the invention is to construct the workpiece 38 of FIG. 8. The full face disc 34 (sometimes referred to as the disc-rim part of the wheel) is made from flat sheet metal starting material in a progressive die stamping transfer press operation as described previously. This operation imparts the desired disc central bolt circle mounting portion 204 having the usual center pilot mounting opening 206, bolt holes 208 and ring-type mounting pad 210 which defines the mounting plane of the wheel when bolted to the vehicle mounting hub or other wheel attachment point of the vehicle. The mounting portion 204 is integrally joined to a surrounding annular disc intermediate portion 212. A circular array of vent openings 214 ("disc windows") are formed in portion 212 which provide for vehicle brake ventilation as well as styling configuration to enhance the outboard appearance of the wheel. Intermediate portion 212 merges radially outwardly integrally with an outer peripheral portion 216 of disc 34 and which provides the outboard tire bead retaining flange pre-cursor portion 32 for workpiece 38. Peripheral portion 216 in its "as-stamped" condition illustrated in radial cross section in FIGS. 8 and 9, has an annular, radially outwardly extending tire-bead retaining flange portion 218 in substantially finished form. The flange curl-pre-cursor portion 32 of peripheral portion 216 extends generally axially and radially outwardly integrally from flange portion 218 in the form of an outboard divergent conical section. The radially inwardly facing surface 220 (FIG. 9) and the radially outwardly facing surface 222 of portion 32 are generally parallel to one another as rough die formed and together define a sectional thickness in portion 32 only slightly less than that of flange portion 218. The outer face 224 of portion 32 remains as sheared in the trim operation in the progressive die stamping transfer press and is generally perpendicular to surfaces 220 and 222. The outboard and inboard faces 226 and 228 of flange portion 218 are die stamped to substantially finished thickness dimension.

The next step in the method of the invention is to manufacture the rim part 36 in accordance with the aforementioned conventional rim making processes to roll form and expand size rim part 36 to have the aforementioned dual bead seats 94 and 158, drop center well 92, "long-leg" portion 88, safety humps 230 and 232, valve hole 234 and a roll formed inboard tire-bead retaining flange 236 having the usual roll formed curl 238 made to comply with Tire and Rim Association specifications. Rim 36 preferably also has the aforementioned radially inwardly curved rim edge flange 240 formed at its outboard free edge in accordance with the aforementioned Overbeck et al U.S. Pat. No. 4,610,482.

In the next further step of the method, rim part 36 and disc part 34 are assembled as shown in FIG. 8 and permanently joined by a circumferentially continuous weld 242 to preferably form a full penetration flare bevel weld joint at the junction of the rim and disc, thereby providing the starting workpiece 38 for further processing in machine 30 in accordance with the further method and apparatus improvements of the invention described hereinafter.

In the subsequent steps performed by machine 30 in accordance with the method of the invention, workpiece 38 is securely clamped and supported for imparting a finished curl profile to the outboard flange pre-cursor portion 32 in the roll forming station of machine 30. This is accomplished by first feeding wheel workpieces 38 one at a time into entry chute 122 from which they are individually released by the catch and kicker mechanism 120 onto the loading fork 150 and then raised to the predetermined workpiece clamping position shown in FIGS. 3 and 4.

In accordance with one feature of the present invention, workpiece 38 is clamped and supported for roll forming by providing improved inner (lower) roll tooling mounted on lower spindles 40 and 42 of machine 30 and comprising an outboard inner (lower) roll 300 and an inboard inner (lower) roll 302 constructed in a first embodiment as illustrated in FIGS. 4–10 and 10A. Outboard inner roll 300 is generally frusto-conical in cross sectional contour and has a central through-bore 304 and key way 306 therein adapted for slidable mounting of the roll on spindle 50 of the outboard lower spindle 40 of machine 30 for rotation therewith about the axis of the spindle. In the embodiment illustrated in FIG. 4, the inboard face 308 of roll 300 is flat and disposed in a plane perpendicular to the rotational axis of the roll. The center outboard face 310 of roll 300 and is likewise flat and parallel to face 308 and merges radially outwardly with a conical face 312 of roll 300 preferably having a cross sectional profile constructed in accordance with the contour and dimensional parameters illustrated in FIGS. 10 and 10A.

The outboard conical surface 312 of roll 300 is suitably indented, as by mutually inclined surfaces 314 and 316 (FIGS. 10 and 10A) to provide swing clearance for the path of travel of edge conditioner roller 104 between its advanced and retracted positions. The working surfaces of inner back-up roll 300 are delineated by points F–K in FIGS. 10 and 10A and comprise a radial planar surface 308 (point K), a convexly curved surface 318 (point J) which merges into a convex surface 320 (point I) having a constant radius of curvature, a convex groove like surface 322 (point H) a conical surface 324 leading outboard from surface 322 at about 5° angle divergent from the axis of roller 300, and a convex surface 326 (point F) having a constant radius of curvature and which merges into surface 316.

In accordance with another feature of the present invention, the maximum outside diameter of roll 300 at surface 320 is made only slightly smaller than the inside diameter of the radially in-turned free edge of the finished curl 202 in the finished wheel 200. For example for a wheel having nominal specifications of 15×6 "J" the minimum inside diameter between the free edges of curl 202 is 16.020 inches, whereas the maximum diameter of roll 300 at point I is 15.550 inches, for a diametrical difference of 0.470 inches. Hence when the lower spindles 40 and 42 are advanced toward one another to clamp workpiece 30, roll 300 will enter beneath the pre-cursor flange portion 32 of workpiece 38 and surfaces 318 and 320 of roll 300 will nest against the curved corner surface 225 of portion 32 which joins the surfaces 220 and 226 (see FIGS. 4 and 9). The flat annular portion 308 of roll 300, which is radially co-extensive with the radially extending annular planar outboard flange surface 226 of workpiece 38, will abut this surface for about 95 to 98% of a full 360° contact therewith even though oriented slightly upwardly (as viewed in FIG. 4) off center with respect to the rotational center line 330 of workpiece 38 (FIG. 4).

Alternatively, if more travel clearance is required or desired for edge conditioner roller 104 in its approach to workpiece precursor flange portion 32, roll 300 can be made to a smaller maximum diameter. This reduction in roll size can be compensated for by a corresponding elevation of the rotational axis of outboard lower spindle 40 as by suitably shimming the carriage slides for this spindle. Also, if necessary, a corresponding adjustment may be made in the toggle actuating linkage for the outboard lower spindle 40, it being understood that as conventionally constructed the rotational axis of spindles 40 and 42 are coaxial in machine 30.

The inboard inner roll 302 is formed at its annular outer periphery with a lead-in convex corner surface 330 (FIG. 4), a smooth, slightly conical rim supporting surface 332 which merges through a corner radius into a shoulder surface 334 extending radially outwardly into (at maximum outside diameter) a curved ridge surface 336, and a conical surface 338 tapering radially inwardly in the inboard direction. Roll 302 also has a mounting through bore 340 and associated key way 342 therein for slidably and removably mounting roll 302 on the inboard spindle 52 in rotational driven relationship. Thus, as seen in FIG. 4, the profile of the outer periphery of roll 302 matches the radially inwardly facing profile of rim 36 (inboard of well 92) and inboard flange curl 238.

In accordance with another workpiece support and orientation feature of the present invention, the maximum diameter of roll 302 at on surface 336 is preferably made slightly larger, e.g., approximately 0.040 inches in the case of a 15×6 wheel workpiece, than the maximum diameter of roll 300 for a set up in which the rotational axes of roll 300 and 302 coincident. Hence, the shoulder surface 334 of roll 302 will contact the inboard radially extending side surface 237 (FIG. 8) of workpiece flange 236 for 360° even though there is a slight diametrical clearance 346 (FIG. 4) between roll surface 336 and flange curl 238 in a arcuate chordal gap zone spaced 180° from the engagement of tooling 44 with the workpiece. Moreover, due to the diametrical size difference between rolls 300 and 302, and with ridge 336 nested beneath curl 238 of workpiece flange 236 because of the weight of workpiece 38 hanging on the roll when initially clamped, the workpiece will be tilted upwardly at its inboard side such that its centerline 330 (WC/L) similarly is inclined slightly (divergently inboard) relative to the coincident rotational axes of rolls 300 and 302 throughout the roll forming phases of the machine cycle.

Figure 11:
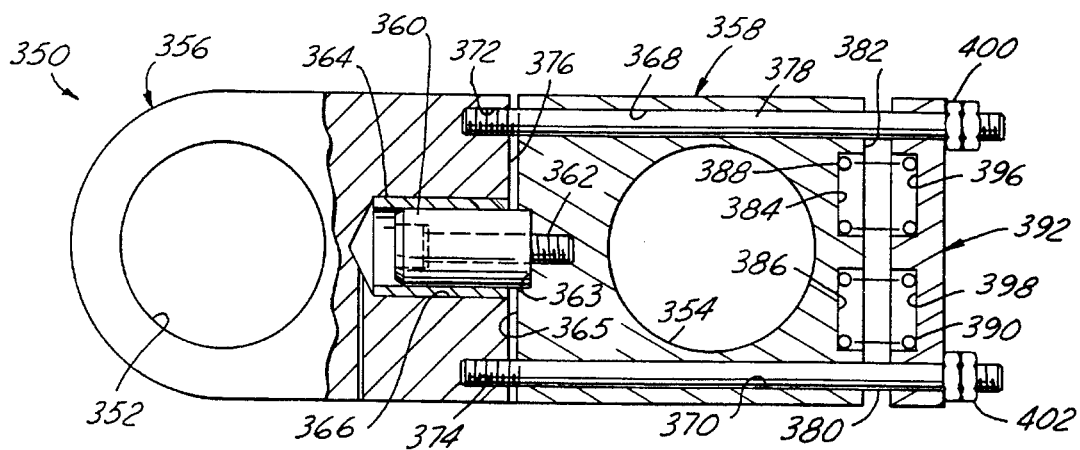
FIG. 11 is a part sectional, part elevational view of a modified lost motion link construction employed in the toggle linkage utilized for actuating the inboard lower spindle of the machine of FIGS. 1 and 2.
Figure 12:
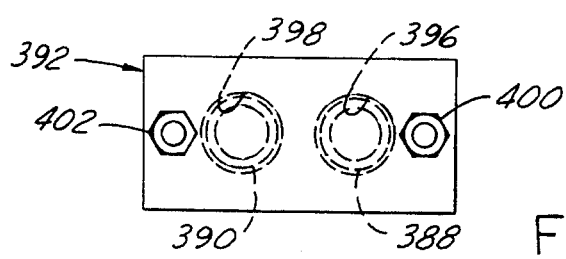
FIG. 12 is an end view of the linkage construction shown in FIG. 11.

In accordance with another workpiece clamping feature of the invention, workpiece 38 is "spring clamped" between the axially opposed rolls 300 and 302. To accomplish this the aforementioned toggle linkage provided in machine 30 for advancing and retracting lower spindles 40 and 42 is modified by replacing a solid connecting link (not shown; provided as original equipment in the side of the linkage actuating the inboard spindle 42) with a lost motion, springbiased split connecting link 350 shown in FIGS. 11 and 12. Thus the prior one-piece link with its two linkage-connecting hinge pin bores 352 and 354 is separated into two link parts 356 and 358 which are slidably coupled end-to-end by a cylindrical guide pin 360 and a pair of slide pins 378 and 380. Pin 360 is bolted by cap screw 362 into a seat 363 in the inner end face 365 of link part 358 and telescopically slides within a bearing sleeve 364 provided in a blind bore 366 formed in the opposed end face 376 of companion link part 356 to thereby coaxially align link parts 356 and 358. Two parallel through bores 368 and 370 are drilled lengthwise through link part 358 adjacent the sides thereof, and two companion sockets 372 and 374 are drilled in the end face 376 of part 356 in coaxial alignment with bores 368 and 370 respectively. Slide pins 378 and 380 are inserted through bores 368 and 370 and their inner ends are received into sockets 372 and 374 and fixed therein, either threadably or by an adhesive. The opposite end face of 382 of block 358 is provided with a pair of spring pockets 384 and 386 for individually receiving one end of compression coil springs 388 and 390 respectively. A spring keeper block 392 having corresponding spring pockets 396 and 398 is slidably received on the protruding ends of guide pins 378 and 380. Keeper plate 392 is adjustably secured in compression against the springs by two pairs of lock nuts 400 and 402 threaded on the free ends of pins 378 and 380.

Multi-part link 350 thus provides a lost-motion, spring-biased yieldable linkage connector in place of the one-piece solid link and is operably adjusted such that, as the spindle actuating toggle linkage pushes spindle 42 on its advance stroke toward spindle 40 during this phase of the machine cycle, roll 302 will engage workpiece 38 prior to the associated spindle carriage slide contacting its inner travel stop. Hence rolls 300 and 302 in this fully advanced condition in the cycle of machine 30 will securely engage workpiece 38 with a spring-biased yieldable clamping force prior to the roll forming operation being performed on the workpiece. Link 350 is designed and adjusted, i.e., lost-motion travel and the appropriate spring force and rate, so as not to completely bottom out regardless of the part-to-part tolerance variations in the axial dimension between the radially outer surfaces 237 and 226 of the inboard and outboard flanges 236 and 218 of workpiece 38 (FIG. 8). The lost motion travel provided by link 350 thus automatically accommodates this part-to-part dimensional variation in the workpiece so that machine 30 can be reliably and rapidly operated in the production process to insure that each workpiece will be securely gripped and clamped on rolls 300 and 302 with a clamping force in the range of about 1,000 to 5,000 pounds. The spring clamping feature also cooperates with the aforementioned substantially "full face" roll supporting workpiece engagement of rolls 300 and 302 to quickly and accurately fix the workpiece in position on the lower tooling and rapidly damps part vibration during this procedure. This co-action improves the accuracy and repetitive reliability of the roll forming operation of machine 30 to thereby reduce tolerance variations in finished parts and hence reduce scrappage rate, and to improve the quality of the finished product.

In the next final clamping and flange curl forming steps of the method of the invention as performed by the improved apparatus of the invention, upper spindle 46 is lowered in the sequence indicated in FIG. 18 until the slide carrying spindle 46 engages a preset stop on carriage 68 (not shown). Spindle 46 is then maintained in this fully lowered (advance) position for the period indicated as "dwell" in FIG. 18. This machine motion drives the powered rotating outer tooling 44 conjointly downwardly into roll forming engagement with workpiece 38, the same being supported for reaction to the downward forces exerted by ram 72 by rolls 300 and 302, which are rotationally driven by and carried on spindles 40 and 42 and rotate about a fixed horizontal axis during all phases of the machine cycle.

Referring in more detail to FIGS. 4–10 and 14, upper tooling 44 is slidably removably installed on upper spindle 46 and includes an outboard outer (upper) roll 410 and and inboard outer (upper) roll 412 (FIG. 4). Rolls 410 and 412 are separated axially by a spacer 414 received on spindle 46 and flanked on their mutually remote faces by additional spacers 416 and 418 to thereby precisely locate the position of rolls 410 and 412 axially in relationship to workpiece 38 and inner rolls 300 and 302.

Figure 5:
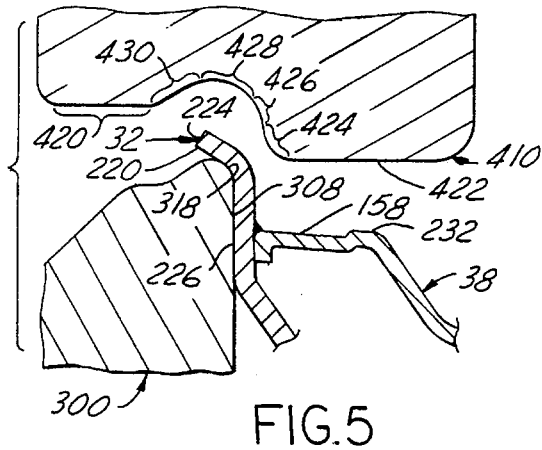
FIGS. 5, 6 and 7 are fragmentary center sectional semi-schematic views of the flange curl roll forming ("profiling") operation on the outboard pre-form flange portion of the wheel workpiece, and respectively illustrating in sequence the outer and inner outboard roll positions relative to the fixtured part as the outer outboard roll is brought to closure position relative to the inner outboard roll in roll forming the finished cross-sectional profile of the outboard flange curl of the wheel.
Figure 6:
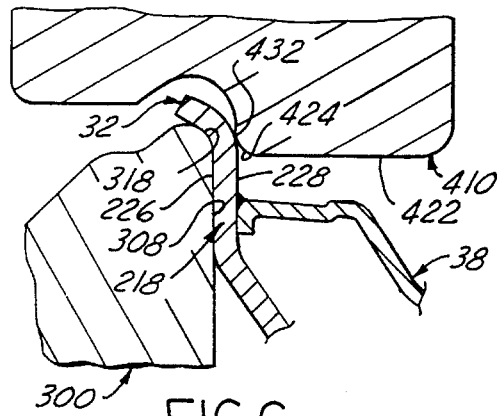
Figure 7:
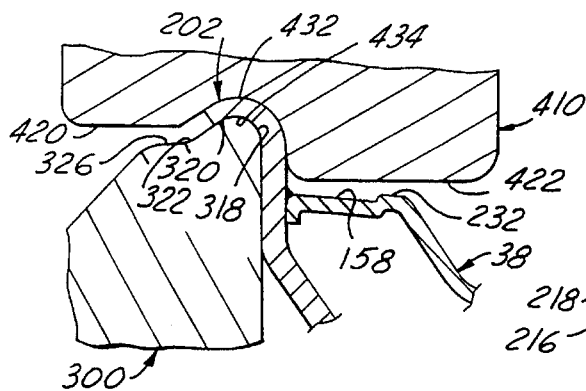

FIGS. 5–7 sequentially illustrate the advancing downward motion of roll 410 relative to workpiece 38 as the same is operably supported on roll 300 (as well as on roll 302, not shown in these views). In FIG. 5 roll 410 has reached the beginning of the "slow" portion of its lowering or advance stroke (FIG. 18). Hence the downward motion of roll 410 illustrated in sequence in FIGS. 5, 6 and 7 is that which occurs in the "slow" portion of the "advance" lowering stroke of upper spindle 46. FIG. 7 illustrates the fully advanced or lowermost position of roll 410 relative to roll 300, this predetermined stop position being maintained throughout the "dwell" phase of the machine cycle. The minimum radial spacing between rolls 300 and 410 in this condition is preset by machine adjustment of the travel stop for the slide carriage 68 which prevents further downward motion of roll 410.

As indicated (partially diagramatically) in FIG. 5, workpiece 38 is now being held tightly against roll 300 with its flange face 226 abutting flat against the radial face 308 of roll 300 by the aforementioned yieldable clamping action of rolls 300 and 302 acting cojointly axially against the workpiece 38. Roll surface 318 nests in the radius of surface 225 (FIG. 9) of pre-cursor portion 32 of workpiece 38 so as securely to support it against movement radially downwardly relative to the rotational axis of rolls 300 and 302.

The periphery of roll 410 is precisely machined to a forming groove contour axially between two radially spaced, cylindrical, non-forming surfaces 420 and 422. As seen in their end-of-work-stroke positions in FIG. 7, surfaces 420 and 422 respectively remain radially spaced out of contact with the radially opposed roll surface 326 as well as with the rim bead seat surface 158 and rim safety hump surface 232 of workpiece 38. The roll forming working surface profile contour of roll 410 comprise a concave curved central groove in roll 410 as defined by roll forming surfaces 424, 426, 428 and 430 (FIG. 5). These working surfaces are contoured relative to the working surface F–K (FIGS. 10 and 10A) of inner roll 300 to accomplish several functions during the motion of roll of 410 downwardly toward roll 300 in the sequence of FIGS. 5–7 in accordance with further features of the method and apparatus of the present invention.

As seen by comparing FIGS. 5 and 6, surface 424 is a convex lead-in camming surface generated on a relatively large radius of curvature, curving upwardly from cylindrical surface 422 and providing the "entrance" surface to the roll forming groove of roll 410. As roll surface 424 approaches workpiece 38 in its clamped position of FIG. 5, surface 424 provides the first rolling engagement point of the rotating roll 410 with workpiece 38 as it is being rotated on and between rolls 300 and 302. It will be seen that the curvature of surface 424 provides an axially directed camming action toward roll 300 as roll surface 424 first engages the inboard facing radial surface 228 of workpiece flange 218 in a zone thereof indicated at 432 at FIG. 9 (which also has a slight convexity curving radially outboard of workpiece 38). It is to be further noted that at this point in the cycle (FIG. 6) the roll groove forming surfaces 426–430 have not as yet engaged the radially outwardly facing surface 222 of flange pre-cursor portion 32 protruding between rolls 300 and 410. Hence, between the first contact of roll surface 424 with zone 432 of workpiece surface 228 and the subsequent roll forming engagement of groove surfaces 426–430 with portion 32, a "kiss and clamp" action sequentially occurs in which roll 410 cams flange 218 more tightly against roll surface 308 to more securely hold it on the curved radially supporting surface 318 of roll 300. Workpiece 38 is thereby further securely braced by this roll nip action to resist the workpiece tilting moment arm developed at this machine cycle when groove surfaces 428–430 of roll 410 first strike the protruding upper surface 222 near the outer tip of flange precursor 32 to cause the same to act as a workpiece tilting cantilever while upper roll 412 is still partially spaced away from the workpiece and thus not fully engaged therewith. In addition, any residual "waviness" circumferentially of flange 218 tends to be ironed or bent out by permanent metal deformation as surface 424 closes and slides or rolls therealong during movement of roll 410 radially towards workpiece 38. Such outboard flange "waviness" can result from thickness variations between flange surfaces 226 and 228 and/or lateral runout of surface 228 remaining as residual effects of the prior progressive die forming operations, assembly operations and/or welding operations utilized in constructing workpiece 38. However, to prevent undue scuffing of the workpiece, care should be observed in contouring the outboard rolls 412 and 300 so as not to "squeeze" too severly in the radially extending portion of workpiece flange 218 radially inwardly of area 432.

As roll 410 is further advanced from the position of FIG. 6 to the final position of FIG. 7, the aforementioned contact and initial camming flange clamping action exerted by roll surface 424 progresses with successive engagement of roll surfaces 426–430 to a full cold working, cold flow roll forming operation as roll surfaces 426–430 contact workpiece 38. This metal working action occurs during the final phase of the slow advance (lowering) of the upper spindle 46 and continues during the dwell portion of the motion cycle (FIG. 18). It will be seen in FIG. 7 that the groove forming surfaces 426–430 are contoured to impart the complementary convex, radially outwardly facing surface 432 (FIGS. 9 and 14) of the finished full face flange curl 202 prior to the completion of the dwell phase of the cycle. The supporting surfaces 318–322 of inner roll 300 simultaneously co-act with roll 410 to impart the finished profile of the radially inwardly facing surface 434 of curl 202. The cold flow of the rim flange metal of flange pre-cursor 32 during this roll forming action into the final profile of the finished curl 202 can also be visualized from the illustration of FIG. 9 wherein the finished profile of curl 202 is superimposed (in broken lines) on the profile of pre-cursor portion 32, only the latter being shown in cross section in this view. However, it is to be further understood that the final configuration of the free edge face 436 of curl 202 is also imparted in this roll forming step due to the conjoint action of the edge conditioner roll 104 with rolls 410 and 300, as next described.

Figure 13:
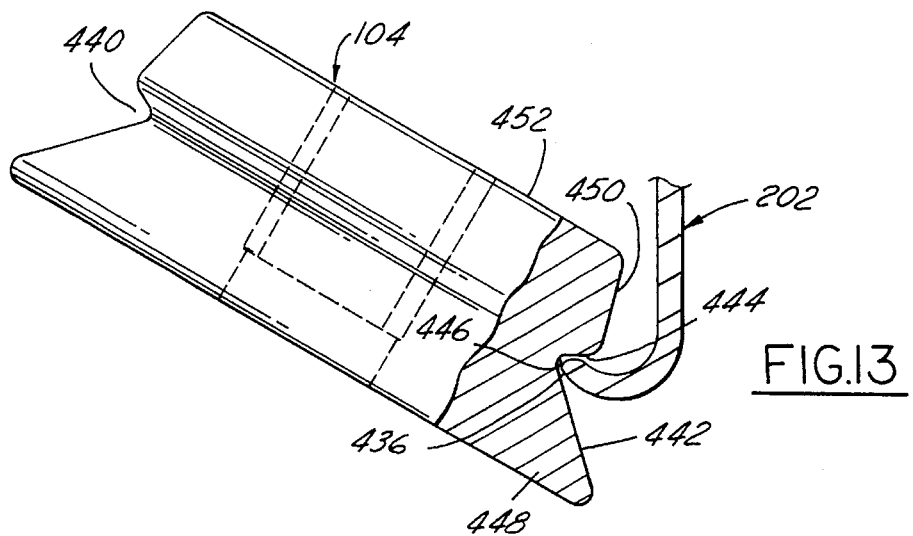
FIG. 13 is a center sectional view of one embodiment of an edge conditioner roll former employed in the apparatus and method of the invention.
Figure 23:
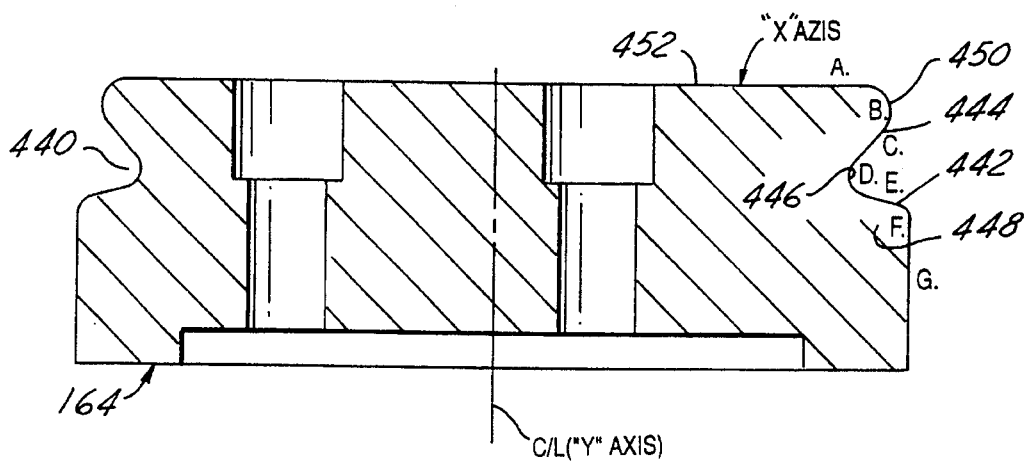
FIG. 23 is a outer cross-sectional view of the edge conditioning roll former of FIGS. 4 and 13 in accordance with the invention and with dimensional coordinates shown below the edge conditioning roll to delineate its preferred cross-sectional profile in one working example thereof.

Referring to FIGS. 4 and 13, edge conditioner roll 104 is preferably made with a cross sectional profile as schematically illustrated in FIG. 13, and as more particularly delineated in FIG. 23, to define an edge conditioning groove 440 axially centered in the roll. Groove 440 is generally V-shaped as defined by flanking conical side surfaces 442 and 444 which converge radially inwardly to an apex groove root surface 446. Groove 440 thus has a configuration similar to that of the edge conditioning groove 46 in the edge conditioning roller 44 as disclosed in U.S. Pat. No. 4,606,206 (assigned to the assignee of record herein). Preferably roller 104 is made asymmetrically to provide a large diameter conical lead-in portion 448 so that groove surface 442 has a dimension in the plane of the drawings in FIG. 13 and 23 longer than that of the corresponding length of groove surface 444. The peripheral surface 450 of roller 104, which extends generally axially between groove surface 444 and the side surface 452 of roll 104 facing workpiece 38 in operation, is cut away relative to the axis of roll 104 to provide better travel and working clearance between roll 104 and workpiece 38 in operation.

As best seen in FIG. 4, the travel of edge conditioner roll 104 and attachment 48 is constructed and arranged to orient the rotational axis of roll 104 at an acute angle of about 72° relative to the rotational axis of rolls 300 and 302 (and that of workpiece 38) when roll 104 is advanced and held in its work position during the first portion of the machine dwell cycle (FIG. 18). Also, preferably roll 104 is mounted for limited axial sliding motion along its axis, which motion may be yieldably constrained by suitable centering biasing springs. Attachment 48 is also preferably actuated by a hydraulic ram set to resist a reaction force, exerted by flange curl 202 as it is being edge roll formed, up to some predetermined pressure relief setting point such as 1,000 psi (acting on a 2" diameter piston working surface). Hence roll 104 can yield and move slightly away from workpiece 38 against the ram force when the reaction forces exerted by workpiece 38 exceed the pressure relief limit of the ram, thereby providing a relatively constant maximum engagement force between roll 104 and the outboard flange free edge as curl 202 is being formed.

Figure 9:
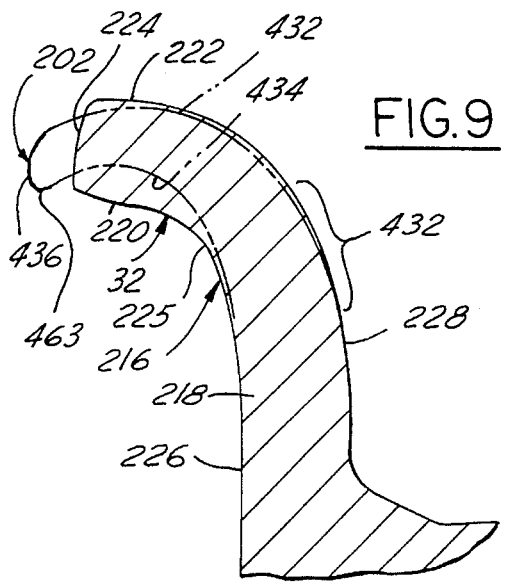
FIG. 9 is a fragmentary cross-sectional view of the outboard flange roll-pre-cursor portion of the disc illustrated in circle A in FIG. 8 but greatly enlarged thereover, and with one embodiment of a flange curl as roll finished in accordance with the invention superimposed in this view.
Figure 14:
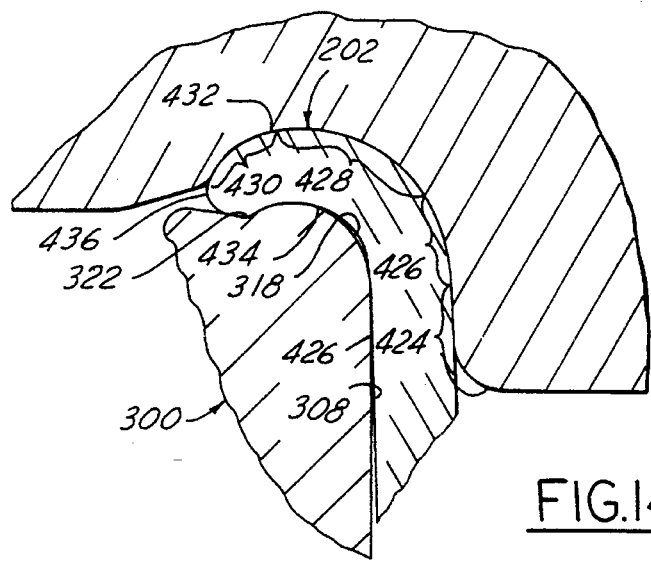
FIG. 14 is a fragmentary cross-sectional semi-schematic view illustrating the final forming position of the inner (lower) and outer (upper) outboard rolls, and the contour of the finished flange curl cross-sectional profile, of one type of outboard rim flange as final formed by the roll forming method and apparatus of the present invention.

Referring again to FIGS. 5–7 as well as FIGS. 4 and 13, during the cold flow of flange metal created by the roll forming action of rolls 410 and 300 occurring between the roll forming stages of FIGS. 6 and 7, the metal of flange pre-cursor portion 32 is being forced to cold flow outboard in the space between the forming surfaces of rolls 410 and 300, and hence the outboard flange will "grow" in an axially outboard direction as it approaches the final profile condition of curl 202 illustrated in FIGS. 9 and 14. This squeezing or ironing action of the flange rolls 410 and 300 produces almost a two-to-one thickness reduction (from pre-cursor 32 starting thickness) in the area between the surfaces 432 and 434 of flange curl 202 and proceeding axially in outboard direction towards the free end face 436 of curl 202. During this flange growing action, groove 440 of roll 104 is already positioned to be in "interfering" relation to the rotating flange metal flowing axially outboard from the workpiece 32 because of the roll squeezing action of rolls 410 and 300. Hence the free edge 436 (FIG. 13) of this nascent flange curl will first lightly engage the long conical surface 442 of roll 104 as it grows in the outboard direction (moving axially away from workpiece 32), thereby camming roll 104 against its yieldable biasing springs and thus tending to center apex 446 of the groove 440 on "point" of the curl edge as it is being formed. The bottom root surface 446 of groove 400 is preferably provided with a constant radius of curvature to impart the desired smooth rounded edge profile to free edge 436 as shown by the finished flange curl embodiments 202 of FIG. 14. Hence the edge conditioning operation tends to resist this outboard movement of the cold flowing metal of flange pre-cursor 32 as it is growing due to the ironing action of rolls 410 and 300 as they relatively advance between the positions of FIG. 6 and 7. This growth thus causes flange metal to move into the predetermined working position of the freely rotating edge conditioning roll 104 on attachment mechanism 48, as contrasted with subsequently bodily moving the edge conditioning roll against a stationarily positioned, rotating, and already formed free edge surface. Edge roll 104 thus preferably is operable to define a "trap" limiting outward growth of the flange curl metal as such is occurring in response to the squeezing action of rolls 410 and 300.

At the completion of the dwell phase of the machine cycle edge conditioner mechanism 48 retracts edge conditioner 104 to a position clear of the adjacent wall 460 of the workpiece chute 56. Upper spindle 46 is then raised by ram 72 to its retracted position, and simultaneously lower spindles 40 and 42 are retracted so that as they spread apart, they release the still rotating and finished workpiece to allow it to drop freely downwardly by gravity onto the tracks of chute 56 where it rolls out of the rear of machine 30.

From the foregoing description of one preferred but exemplary embodiment of the method and apparatus of the invention, it will be seen that its features cooperatively and cojointly achieve the aforestated objects of the invention, as well as providing many advantages over the prior methods and processes for making the aforementioned commercial full face wheel with the machined outboard flange. The outboard roll forming, flange profiling operation accomplished in machine 30 utilizing the method and apparatus of the invention is effective to produce a flange profile or contour on the outboard flange 202 of wheel 200 which fully meets Tire and Rim Association specifications and has a smooth hard surface on both the radially inwardly and radially outer surfaces 432 and 434 of curl 202. These surfaces are characterized by increased hardness and strength as compared to a machined surface imparted to a progressive die formed pre-cursor portion 32, and are further characterized by the elimination of the machining grooves on their surfaces as it occurs in the prior art flange-making operations.

Figure 17:
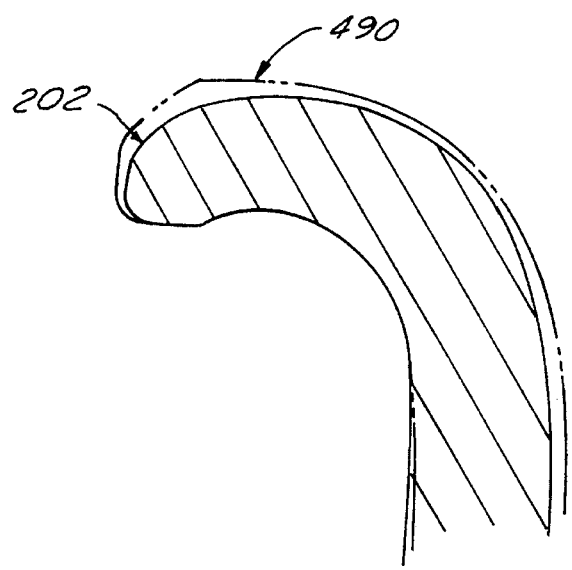
FIG. 17 is a fragmentary cross sectional illustration of the flange curl form of FIGS. 9 and 14, enlarged thereover, and having the profile of a typical machined flange as presently commercially made by the aforementioned machining operations performed on the wheel workpiece of FIG. 8, and superimposed with reversed cross sectioning, in this view of FIG. 8.

By properly controlling the tolerances on the configuration of the "as-stamped" pre-cursor portion 32 in the progressive die forming operation of disc 34, the forming rolls 410 and 300 acting cojointly with edge conditioner 104 can successfully work this relatively crude shape into the desired curl profile of flange curl 202 without requiring the hitherto expensive pre-operation of lathe edge trimming of part 34 before assembly to rim 36 to form workpiece 38. Machine 30 can be operated in accordance with the method and roll form tooling parameters of the invention at a very rapid rate in a continuous repetitive manner in a high speed mass production wheel making facility. For example, the total cycle time for workpiece 38, from being kicked by feeder mechanism 120 into machine 30 and exiting the rear of the machine via chute 64, is on the order of about 5 to 7 seconds. By contrast, the prior outboard flange machining operation required to hitherto finish the same from the shape of pre-cursor portion 32 as shown in FIG. 9 to the shape of a commercial prior machined flange as shown at 490 in FIG. 17 (cross sectioned and superimposed over a roll formed flange 202 of the invention) averaged a much longer period of time just in the machining cycle, e.g., about 60 seconds.

In addition, the method of the invention is believed to impart a better "trueness" to the outboard flange, primarily as to uniformity of thickness in the "curl" portion of flange 202, but possibly also in its own lateral runout and that relative to the inboard flange, as compared to the die stamped machined flange of the commercially available full face wheels described previously.

The slight elevation of the inboard flange 236 of workpiece 238 and associated inboard bead seat 94 relative to the outboard bead seat 158 and outboard pre-cursor flange 32, achieved by the co-action of the diameter differential of clamping rolls 300 and 302 as described previously, has been found to prevent an undesired growth of the flange curl 202 diametrically of workpiece 38 during the roll forming action. If workpiece 38 is clamped and oriented so as to have its constructional rotational axis parallel to the rotation of the axis of rolls 300 and 302, or even tilted downwardly from this relationship (as viewed in FIG. 4) the outside diameter of the finished flange curl 202 will be increased. Likewise, it has been found that further tilting up of the workpiece by the clamping action of rolls 300 and 302 over the preferred dimensional relationship described previously herein will cause the outside diameter of curl 202 to further decrease as curl 202 is formed and finished.

The conjoint action of the almost 360° contact of the clamping rolls 300 and 302 under a constant spring-pressure-induced squeeze force on the workpiece provides greater part-to-part uniformity of in repetitive, high speed mass production roll forming. Hence dimensional specifications and tolerances can be reliably maintained within close limits in flange curl 202. The 360° clamping contact preferred for roll 302 bearing against the radially inboard flange surface 237 also provides an anti-tilt back up of workpiece 38 to resist the large tilting reaction forces developed as the outboard edge 436 of curl 202 is being formed by the resistance forces of the edge conditioner roll 104 reacting thereagainst. This feature also enables the edge conditioning apparatus 48 to be positioned and operated in the roll forming station at a location spaced about 180° from the forming zone of the upper tooling 44. Hence concurrent flange roll curl forming and edge conditioning can both be achieved in the same work station of machine 30, and edge conditioning can be made part of the cold forming operation of edge curl 202 in conjunction with the action of rolls 300 and 410.

Figure 15:
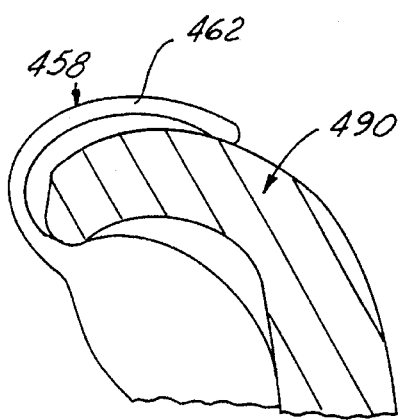
FIGS. 15 and 16 are fragmentary cross-sectional photoprint illustrations of the outboard flange curl forms of a typical machined full face wheel outboard flange as presently commercially made by the aforementioned flange machining operations (FIG. 15), and of a finished full face wheel outboard flange curl as final formed by the roll forming apparatus of the invention, and also illustrating a standard balance weight attached to each of these flanges.
Figure 16:
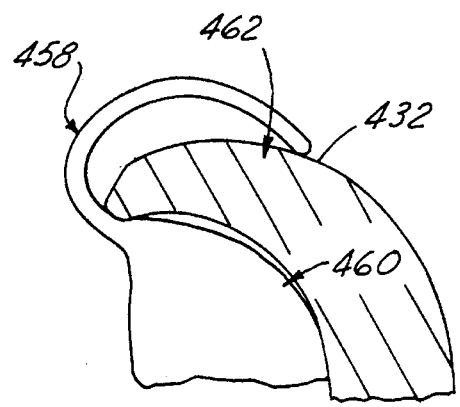

Referring to FIGS. 15 and 16, one primary advantage of the present invention is that it enables a full face wheel to have roll formed tire-bead retaining flanges at both its inboard and outboard edges, and which are sufficiently similar in cross sectional profile so that a conventional balance weight 458 which fits the inboard (or rear) rim flange will also fit and be acceptable in service on the outboard rim flange. This wheel product parameter hitherto required the after-assembly outboard flange machining operations. As illustrated in FIG. 16 a standard balance weight 458 having the usual lead alloy weight body 460 and spring metal clip 462, is readily accepted on the roll form flanged curl 202 of the invention and reliably retained thereon in service. The weight 450 nests under radially inwardly facing edge corner 464 of curl 202 (FIG. 9) and the spring clip prong 466 flexes from its free state condition to the stressed and attached condition (illustrated in FIG. 16) resting on the smoothly rolled surface 432 of flange curl 202.

FIG. 15 illustrates balance weight 458 similarly attached to prior art machined outboard 490 flange.

Modified Embodiment of FIG. 19

Referring to FIG. 19, a full face wheel workpiece 500 is illustrated in cross section also made in accordance with the pre-roll forming manufacturing steps described previously. Workpiece 500 differs from workpiece 38 in having a disc part 502 differing from disc part 34 in the configuration of the disc intermediate portion 212' as compared to intermediate portion 212 of disc 34. It will be seen that portion 212' presents a generally convex shape to the outboard face of workpiece 500 due to the intermediate disc portion 212' protruding axially outboard relative to the outboard flange surface 216'. Hence in order to perform the method of the present invention as described previously hereinabove relative to workpiece 500, a modified outboard inner roll 300' is provided. Roll 300' has its inboard face "hollowed out" by forming a frusto conical surface 504 extending radially inwardly and outboard from a point on the radial planar surface 308' generally axially aligned with the outboard rim bead seat 158. Face surface 504 progresses radially inwardly at about a 30° angle to meet with a radially extending planar central surface 506 which terminates at bore 304 of roll 300'. Roll 300' can thus provide working clearance for a greater variety of full face wheel styles in performing the outboard flange profiling operation of the invention, and indeed can also be used in place of roll 300 in manufacture of wheel 200 of FIG. 4 utilizing workpiece 38.

FIG. 19 also illustrates a slightly modified inboard inner roll 302' but which also is designed to have the aforementioned 360° contact between its annular shoulder face 334' and the radially extending, annular face 237 of the inboard rim flange 236 when in fully clamped and workpiece engaged condition. However, the maximum outside diameter of a peripheral surface 338' of roll 302' is made sufficiently smaller than the inside diametrical dimension of the rolled rim curl 510 of flange 236 to always insure a large working clearance therebetween in the workpiece clamped position. A slightly tapered conical surface 332' of roll 302 is thus used as both a lead in camming surface during clamping engagement of workpiece 500 (or 38) occurring in the advance stroke of the opposed rolls 300' and 302', and also as the workpiece axis orienting surface in the fully clamped, roll forming work cycle of machine 30. If desired, inboard inner roll 302' may have surface 332' made to closely slidably fit the nominal radially inwardly facing contour of rim 36 radially opposite bead seat 94 in the fully engaged, clamped position of roll 302' to provide even more secure backup against the tilting effects of edge conditioning roller 104 and to better stabilize workpiece 500 during the roll forming operation. However this will require in some instances adjusting the rotational axis 512 of roll '302 and that of the associated lower inboard spindle 42 downwardly (as viewed in FIG. 19) to offset the rotational axis 512 of roll 302' downwardly from the rotational axis 514 of roll 300', the rotational axis of roll '302 thus made substantially coincident with the rotational center axis of wheel workpiece 500 in use.

In one working example for constructing wheel 202 in accordance with the above described method and apparatus of the invention, the following operational parameters were observed (for making Motor Wheel Wheel Part No. 42388):

| | |
|---|---|
| Basic dimensional parameters of wheel workpiece 38 Diameter | 15" |
| Bead seat spacing (equivalent rim width) | 6" |
| Tire and rim contour spec | J |
| Maximum outside diameter of roll 300 | 15.550" |
| Maximum outside diameter of roll 302 | 15.590" |
| Maximum radial force between upper and lower spindles | 60,000 lbs. |
| Upper spindle maximum torque | 5,100 in-lbs |
| Upper spindle idle speed | 500 RPM |
| Upper spindle rotational speed during workpiece engagement | 500 RPM |

-continued

| | |
|---|---|
| Lower spindles combined torque | 14,000 in-lbs |
| Lower spindle idle speed | 330 |
| Lower spindles rotational speed during work engagement | 330 |
| Machine cycle time including automatic load and unload | 4.6 sec. |
| Machine cycle dwell time | 1.7 sec. |
| Material of workpiece 38 (M.W. Spec. 80740) | HSLA Steel |
| maximum force exertable perpendicular to rotational axis of 104 during roll forming operation | 70 KSI min. tensi |

It is to be further noted that by employing the large diameter inner rolls 300, 300' and 302, 302' as described previously, and by setting the appropriate rotational speeds of such rolls relative to the rotational speed of the upper tooling 44, excessive skidding between the rolls and workpiece is avoided. Workpiece wobble also is minimized or eliminated, and scoring of the inner periphery 434 of flange curl 202 is reduced during acceleration and deceleration of the workpiece to and from rotational work speed as well as during the roll forming cycle.

It is also to be noted from FIGS. 4 and 19 that the peripheral surface 413 of the outer (upper) inboard roll 412 is suitably profiled to match the complementary radially outwardly facing opposed surface of rim 36 to thereby lightly clamp the workpiece against the opposed surface 332' of roll 302' (or the corresponding surface 332 of roll 302) during the dwell phase of the machine cycle. Also if desired, the inboard facing, radially extending annular surface 415 of roll 412 (FIG. 19) can be designed to fit close against the tire-side surface 239 of rim flange 236 to impart a conjoint truing action to the inboard rim flange during the roll forming operation. The clamping action of inboard outer roll 412 against rim 36 during the dwell cycle also provides further reaction support against the opposing tilting forces generated during the edge conditioning operation.

Second Embodiment of Roll Formed Flange Curl

Figure 20:
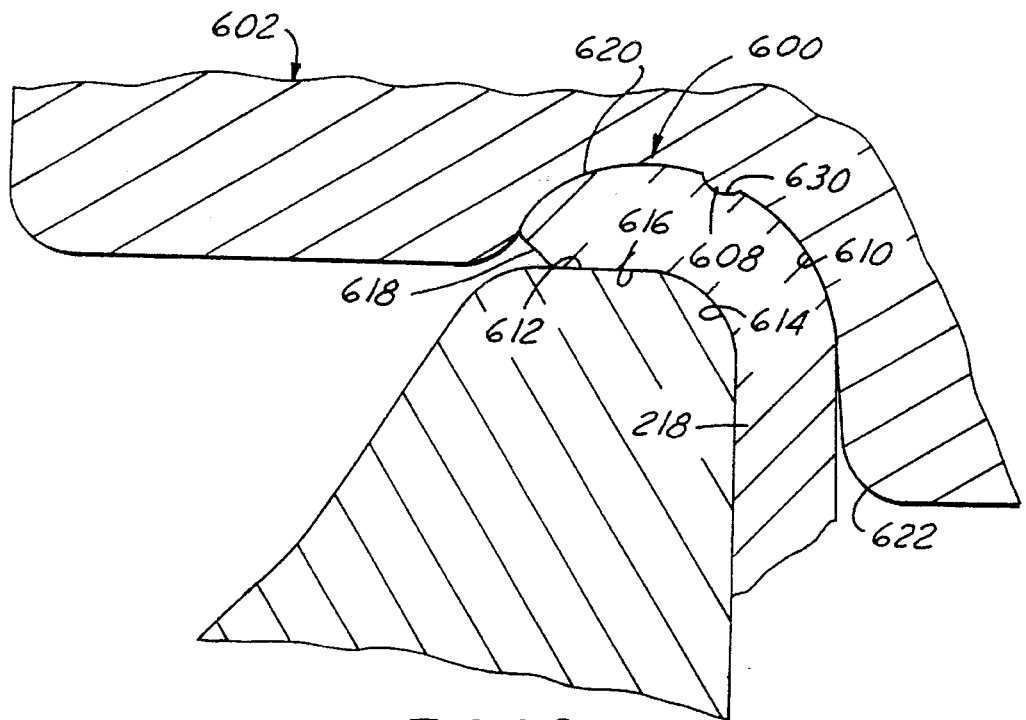
FIG. 20 is a fragmentary enlarged center cross-sectional view illustrating the final forming position of a modified embodiment of the inner and outer outboard rolls, and the contour of the finished flange curl cross-sectional profile of a modified full face wheel outboard flange also final formed by the roll forming method and apparatus of the present invention.
Figure 21:
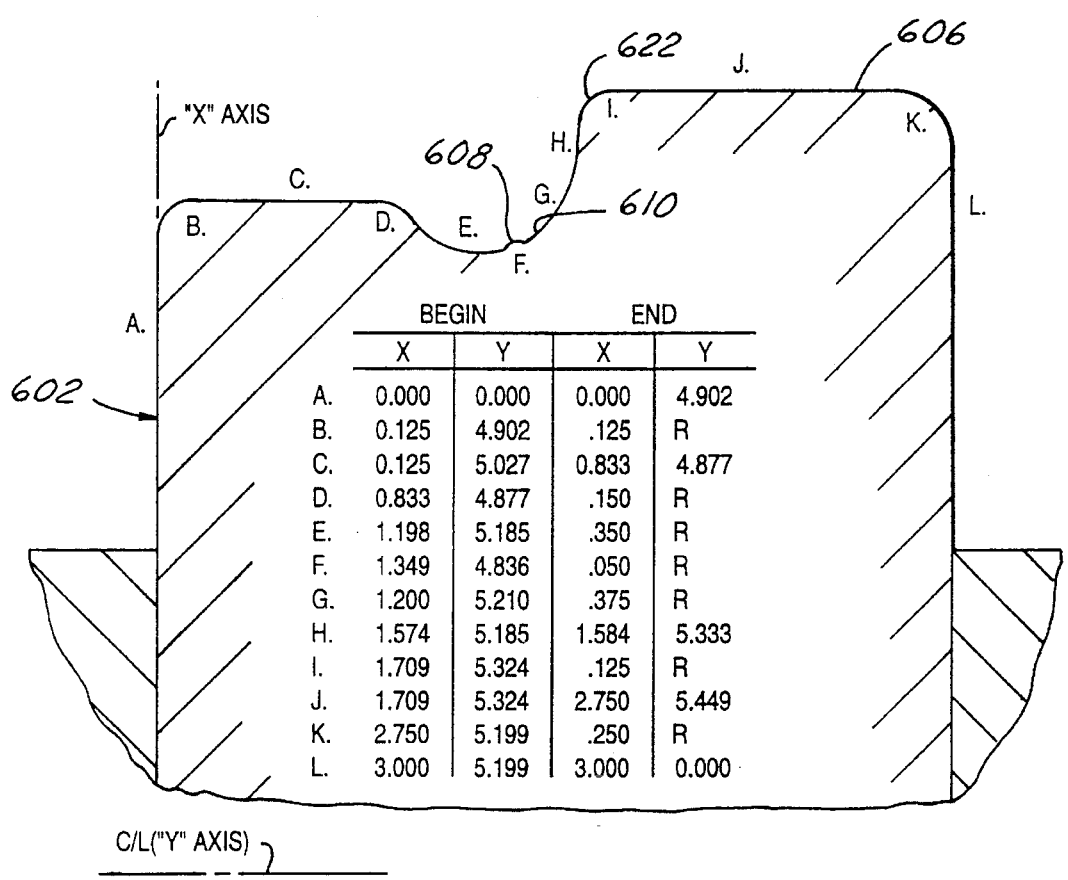
FIG. 21 is an enlarged fragmentary cross-sectional view of the modified outer outboard roll of FIG. 20 (inverted therefrom) and with dimensional coordinates illustrated thereon to delineate the roll cross-sectional profile in one working example thereof.
Figure 22:
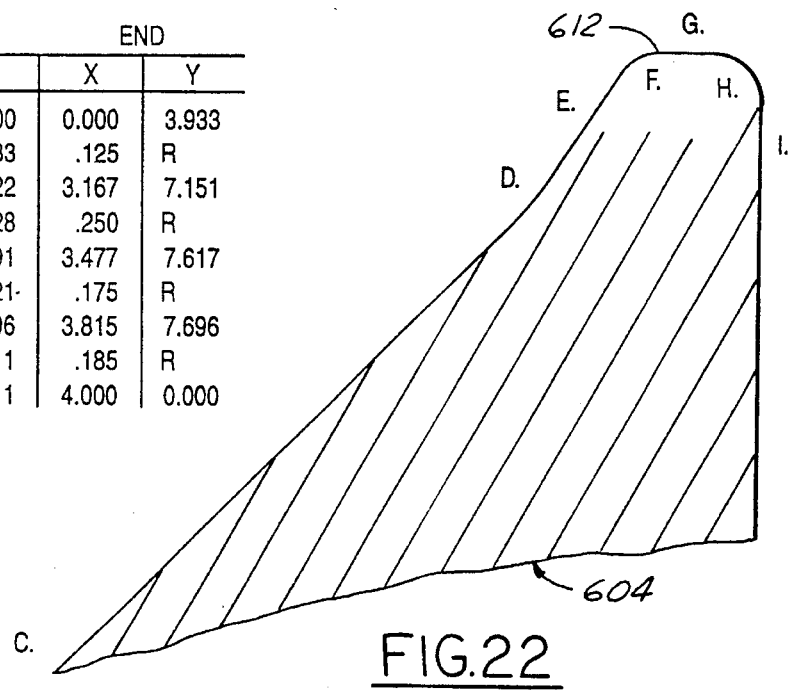
FIG. 22 is an enlarged fragmentary center cross-sectional view of the modified outer inboard roll of FIG. 20 with dimensional coordinates illustrated thereon to delineate the roll profile in the working example of FIG. 20.

Referring to FIGS. 20, 21 and 22, in a second embodiment of the method and apparatus of the invention illustrated therein a modified full face wheel outboard flange 600 is roll formed to final contour utilizing machine 30 as described previously in conjunction with the profiling tooling 44, 300 and 302, or the modifications thereof described in conjunction with FIG. 19, except that modified outboard rolls 602 and 604 are substituted for the previously described roll 410 and roll 300 (or 300') respectively. The outboard outer (upper) roll 602 has a cross sectional profile on its peripheral surface 606 laid out in accordance with the illustration and dimensional coordinates delineated (in inches) in FIG. 21. Note that at point F an annular rib 608 protrudes radially outwardly from the rotational axis of roll 602 about midway in the roll forming groove surface 610 of roll 602.

The outboard inner (lower) roll 604 is similar to rolls 300 (or 300') described previously except that its roll forming profiling working surface 612 is defined by coordinate points D–I in FIG. 22 to conform the contour thereof shown in FIG. 20 in accordance with the dimensional coordinates set forth (in inches) in FIG. 22. It is to be understood in FIG. 22 that the "X" axis is again the centerline or axis of rotation of roll 604 (as in FIGS. 10 and 10A) and that the origin of the "Y" axis is again located at the outboard flat end face 310 (FIGS. 4 and 10) of roll 604.

Utilizing outboard roll 602 and 604 constructed as described above, the same are operated in accordance with the previously described method sequence by operating machine 30 as described previously in conjunction with formation of flange curl 202. However, with the modified profiling contours of rolls 602 and 604, flange curl 600 differs from flange curl 202 in several respects. The outboard corner radius surface 614 of flange curl 600 is similar to the corresponding area of flange curl 202, but merges in an outboard direction with a generally cylindrical flange and surface 616 facing radially inwardly of the wheel workpiece. Surface 616 extends axially outboard from the workpiece and merges with an annular free edge surface 618 which is inclined about a 45° axis relative to the workpiece axis and is divergent therefrom in an outboard direction. The radially outwardly facing surface 620 of flange curl 600 is convexly curved as illustrated in FIGS. 20 and 21 to provide a smooth curvature to facilitate tire mounting in accordance with Tire and Rim Association specifications.

In accordance with one feature of flange curl 60, surface 620 is spaced radially of workpiece 38 from curl inner surface 616 by a greater distance than the corresponding, surfaces of flange curl 202, i.e., curl 600 is radially thicker than curl 202 generally throughout its curvature. It is also to be noted that a portion of curl 600 between rib 608 and the lead-in radius corner surface 622 of roll 602 is designed such that a minimum of metal cold flow takes place during the relative working stroke of the rolls 602 and 604. Hence the curvature imparted to flange curl 600 in this portion of flange 218 occurs primarily as a bending rather than cold flowing action.

In accordance with another feature of the modified flange curl 600 and method and apparatus of FIGS. 20–22, an annular groove 630 is formed in the outer peripheral surface 620 of curl 600 which is circumferentially continuous and made in accordance with the dimensional coordinates specified in FIG. 21. Circumferential groove 608 provides a hook-on or hook engagement point for the free end of the spring clip 462 of a balance weight 458 as described previously or, alternatively, to provide a hook-in point for the free end of a tang struck inwardly from the spring clip as provided in certain other commercial balance weights. Groove 608 thus assists in meeting the industry "pull-off" specifications for balance weights, particularly on those rolled flange curls made in accordance with the invention which are to be chrome plated. In this regard, it is also to be noted that the cylindrical profile of the radially inwardly facing surface 616 of flange curl 600 also facilitates electrodeposition of chromium on the finished wheel in chrome plating processes because of its lack of a re-entrant-type surface curvature. Also by making curl 600 radially thicker than curl 202, the cold flow of metal during roll forming can be primarily limited to the zone extending axially outboard from rib 608 to the outboard termination of forming groove surface 610. Thus roll rib 608 can be located so as not to form a "dam" or obstruction tending to significantly restrict any metal cold flow which might otherwise occur from an area inboard of the location of rib 608.

It is also to be understood that edge conditioning roll 104 is suitably modified to form the contour of curl edge surface 618 in the manner previously described during the flange profiling operation of the rolls 602 and 604 and cojointly therewith. Thus all of the operations required to profile flange curl 600 are again accomplished in a rapid, reliable and efficient manner in one complete cycle of machine 30 when equipped with modified roll 602 and 604 and the associated modified edge conditioning roll 104, thereby providing the features and advantages described previously as well as providing a modified flange curl 600 well adapted to chrome plating and balance weight retention on chrome plated flange curl surfaces.

It is also to be understood that, although the foregoing description and drawings describe and illustrate in detail successful working embodiments of the present invention, to those skilled in the art to which the present invention relates the present disclosure will suggest many modifications and constructions as well as widely different embodiments and applications without thereby departing from the spirit and scope of the invention. The present invention, therefore, is intended to be limited only by by the scope of the appended claims and the applicable prior art.

We claim:

1. A method of making a full face metal fabricated wheel of the type having a disc fabricated from sheet metal and including a disc central bolt circle mounting portion, a disc intermediate portion extending generally radially outwardly from the bolt circle mounting portion and including an array of window-vent openings, and a disc outer peripheral portion surrounding the intermediate portion and providing an outboard tire bead retaining flange for the wheel, and the wheel further having a rim part including an inboard tire bead retaining flange, an inboard tire bead seat portion, a drop-center well portion, an outboard bead seat portion, and a rim edge portion extending circumferentially continuously around the rim edge adjacent the rim outboard bead seat, the rim and disc parts being permanently joined at a circumferentially continuous junction of the rim edge portion and the disc outer peripheral portion, said method comprising the steps of:

(1) progressive die forming the disc so as to have the outer peripheral flange portion partially formed to define a radially extending tire-bead retaining and sealing surface portion in substantially finished form and a unfinished curl-pre-cursor portion extending axially and radially outwardly generally in the form of an outboard divergent conical section;

(2) forming the rim to generally finished form;

(3) then permanently assembling the disc and rim in operative relationship to provide a full face wheel workpiece;

(4) providing in a roll forming machine outboard and inboard inner back-up rolls spaced axially apart from and bodily movable axially relative to one another, said outboard inner roll having a peripheral roll forming contour complemental to the desired finished contour of the radially inwardly facing surface of the finished wheel outboard flange curl;

(5) clamping the workpiece for roll forming by moving the axially spaced apart and opposed inner outboard and inboard back-up rolls axially relative to one another into opposed clamping engagement with the inboard and outboard flange faces of the workpiece such that the outboard inner roll is juxtaposed by such clamping with the forming contour thereof radially inwardly at and against the outboard flange curl pre-cursor portion in a roll forming zone of the machine and workpiece;

(6) providing outer inboard and outboard rolls rotatable on an axis generally parallel to the rotational axes of said inner rolls, and bodily movable transverse to the workpiece axis between travel end limits defining a working stroke and a retraction stroke respectively toward and away from the outer periphery of the clamped workpiece, the outer outboard roll being constructed and arranged to have a roll forming profile groove cooperable with the roll forming contour of the outboard inner roll operable to roll form to a desired finished contour profile the finished wheel outboard flange curl, the inboard outer roll being constructed and arranged to have a profile operable to roll engage the outer periphery of the rim of the workpiece adjacent the inboard flange thereof generally at the end limit of the working stroke of the outboard outer roll;

(7) roll forming the desired finished contour of the finished wheel outboard flange curl while the workpiece is clamped as set forth in step (5) by power rotating all of said rolls to rotate the workpiece in an axially stationary position and then causing said outer rolls to move in a direction radially thereof to the working stroke end limit to thereby first bend over said flange pre-cursor portion and then roll form and iron the same by causing cold flow of metal between the outboard inner and outer rolls as they close during the working stroke to thereby finish form the wheel outboard flange curl.

2. The method as set forth in claim 1 wherein the outboard inner and outer rolls are profiled on their working roll forming surfaces to cooperate with one another to cause the workpiece outboard flange portion to first be engaged by the outboard outer roll forming surface on an axially inboard facing surface of the flange pre-cursor portion to first force the same axially in an outboard direction against the mating surface of the outboard inner roll to thereby kiss and clamp the workpiece securely in rotational working position prior to initiation of the bending and cold flow roll forming conjoint action of the outboard rolls to thereby assist in restraining the workpiece against tilting of its axis during such forming operation of said rolls.

3. The method as set forth in claim 2 wherein step (5) of clamping the workpiece between the axially opposed inner rolls is performed by causing the rolls to yieldably grip the workpiece therebetween with a spring-biased clamping force such that a run of workpieces having tolerance variations in the actual dimensions between the faces gripped by the rolls are sequentially individually securely and firmly gripped in proper roll forming orientation and support in each clamping stage of the roll forming operation in the production run.

4. The method as set forth in claim 3 wherein said inner and outer rolls are constructed and arranged to orient the workpiece with its axis tilted upwardly slightly divergently inboard of the workpiece relative to the rotational axis of the inner rolls during the clamping and roll forming steps of the method.

5. The method as set forth in claim 3 wherein the clamping step includes providing inner outboard and inner rolls with an annular workpiece engagement face diameter adapted to each provide substantially full 360° contact with the axially opposed gripped faces of the workpiece during the clamping and rotation of the workpiece in the roll forming steps of the method.

6. The method as set forth in claim 5 wherein the maximum outside diameter of the inner outboard roll is made slightly less than that of the inboard inner roll and the rotational axis of the inboard inner roll is offset in a direction perpendicular thereto from the rotational axis of the inner outboard roll during the clamping and roll forming stages of the operation to thereby accommodate such difference in diameter of the inner rolls.

7. The method as set forth in claim 3 wherein the roll forming machine is constructed and arranged to move the outboard outer roll through a working stroke toward the outboard inner roll in the roll forming operation to a working stroke end limit position having a predetermined and fixed spacing radially of and between the outboard rolls.

8. The method as set forth in claim 7 wherein the work position of the forming profile of the outboard inner roll relative to the position of the supporting profile of the inboard inner roll is adjusted to cause a predetermined angular orientation of the workpiece rotational axis relative to the rotational axis of the inner rolls to thereby predetermine the maximum outside diameter of the finished roll formed flange curl as it is roll formed during step (7).

9. The method as set forth in claim 8 wherein said inner and outer rolls are constructed and arranged to orient the workpiece with its axis tilted upwardly slightly divergently inboard of the workpiece relative to the rotational axis of the inner rolls during the clamping and roll forming steps of the method.

10. The method as set forth in claim 8 wherein the inboard inner roll is constructed and arranged to substantially entirely radially support the radially facing interior surface of the inboard portion of the workpiece rim throughout substantially 360° during the clamping and roll forming operations.

11. The method as set forth in claim 10 wherein the clamping step includes providing inner outboard roll with an annular workpiece engagement face diameter adapted to provide substantially full 360° contact with the axially opposed gripped face of the workpiece during the clamping and rotation of the workpiece in the roll forming steps of the method.

12. The method as set forth in claim 11 including the further step of providing in the machine an outboard flange edge conditioning roll former at a station generally diametrically opposed relative to the workpiece from the outer forming rolls, and positioning the roll forming roll adjacent the flange pre-curl portion of the workpiece adjacent its rotational path and spaced therefrom at a pre-set position such that the metal cold flowing during roll forming of the pre-cursor portion in an axially outwardly direction of the workpiece is caused to flow into and against a roll forming groove in the edge conditioning roll to thereby roll form the outboard free edge of the flange curl simultaneously with the roll forming of the curl profile by the outboard rolls.

13. The method as set forth in claim 12 wherein the outboard inner roll has a generally concave surface disposed thereon radially inwardly thereon of a surrounding annular workpiece clamping surface operable for engaging the outboard flange surface of the workpiece, the concave surface being constructed and arranged to accommodate a convex surface contour provided in the intermediate portion of the disc of the workpiece during the clamping and roll forming steps of the method.

14. The method as set forth in claim 13 wherein the profile of the outer inboard roll is complemental to the angulation of the outer peripheral profile of the workpiece rim adjacent the inboard flange of the workpiece.

15. The method as set forth in claim 10 including the further step of providing in the machine an outboard flange edge conditioning roll former at a station generally diametrically opposed relative to the workpiece from the outer forming rolls, and positioning the roll forming roll adjacent the flange pre-curl portion of the workpiece adjacent to its rotational path and spaced therefrom at a pre-set position such that the metal cold flowing during roll forming of the pre-cursor portion in an axially outboard direction of the workpiece is caused to flow into and against a roll forming groove in the edge conditioning roll to thereby roll form the outboard free edge of the flange curl simultaneously with the roll forming of the curl profile by the outboard rolls.

16. The method as set forth in claim 3 wherein the inboard inner roll is constructed and arranged to substantially entirely radially support the radially facing interior surface of the inboard portion of the workpiece rim throughout substantially 360° during the clamping and roll forming operations.

17. The method as set forth in claim 16 including the further step of providing in the machine an outboard flange edge conditioning roll former at a station generally diametrically opposed relative to the workpiece from the outer forming rolls, and positioning the roll forming roll adjacent the flange pre-curl portion of the workpiece adjacent its rotational path and spaced therefrom at a pre-set position such that the metal cold flowing during roll forming of the pre-cursor portion in an axially outboard direction of the workpiece is caused to flow into and against a roll forming groove in the edge conditioning roll to thereby roll form the outboard free edge of the flange curl simultaneously with the roll forming of the curl profile by the outboard rolls.

18. The method as set forth in claim 17 wherein the work position of the forming profile of the outboard inner roll relative to the position of the supporting profile of the inboard inner roll is adjusted to cause a predetermined angular orientation of the workpiece rotational axis relative to the rotational axis of the inner rolls to thereby predetermine the maximum outside diameter of the finished roll formed flange curl as it is roll formed during step (7).

19. The method as set forth in claim 18 wherein the roll forming machine is constructed and arranged to move the outboard outer roll through a working stroke toward the outboard inner roll in the roll forming operation to a working stroke end limit position having a predetermined and fixed spacing radially of and between the outboard rolls.

20. The method as set forth in claim 1 including the further step of providing in the machine an outboard flange edge conditioning roll former at a station generally diametrically opposed relative to the workpiece from the outer forming rolls, and positioning the roll forming roll adjacent the flange pre-curl portion of the workpiece adjacent its rotational path and spaced therefrom at a pre-set position such that the metal cold flowing during roll forming of the pre-cursor portion in an axially outboard direction of the workpiece is caused to flow into and against a roll forming groove in the edge conditioning roll to thereby roll form the outboard free edge of the flange curl simultaneously with the roll forming of the curl profile by the outboard rolls.

21. The method as set forth in claim 1 wherein the inboard inner roll is constructed and arranged to substantially entirely radially support the radially facing interior surface of the inboard portion of the workpiece rim throughout substantially 360° during the clamping and roll forming operations.

22. The method as set forth in claim 1 wherein the maximum outside diameter of the inner outboard roll is made slightly less than that of the inboard inner roll and the rotational axis of the inboard inner roll is offset in a direction perpendicular thereto from the rotational axis of the inner outboard roll during the clamping and roll forming stages of the operation to thereby accommodate such difference in diameter of the inner rolls.

23. The method as set forth in claim 1 wherein the outboard inner roll has a generally concave surface disposed thereon radially inwardly of a surrounding annular workpiece clamping surface operable for engaging the outboard flange surface of the workpiece, the concave surface being constructed and arranged to accommodate a convex surface contour provided in the intermediate portion of the disc of the workpiece during the clamping and roll forming steps of the method.

24. The method as set forth in claim 1 wherein the profile of the outer inboard roll is complemental to the angulation of the outer peripheral profile of the workpiece rim adjacent the inboard flange of the workpiece.

25. The method as set forth in claim 1 wherein the work position of the forming profile of the outboard inner roll relative to the position of the supporting profile of the inboard inner roll are adjusted to cause a predetermined angular orientation of the workpiece rotational axis relative to the rotational axis of the inner rolls to thereby predetermine the maximum outside diameter of the finished roll formed flange curl as it is roll formed during step (7).

26. The method as set forth in claim 1 wherein the roll forming machine is constructed and arranged to move the outboard outer roll through a working stroke toward the outboard inner roll in the roll forming operation to a working stroke end limit position having a predetermined and fixed spacing radially of and between the outboard rolls.

* * * * *

UNITED STATES PATENT AND TRADEMARK OFFICE
CERTIFICATE OF CORRECTION

PATENT NO. : 5,531,024
DATED : July 2, 1996
INVENTOR(S) : Danny E. Lowe and Kevin D. Jurus It is certified that error appears in the above-indentified patent and that said Letters Patent is hereby corrected as shown below:

Title page, item [73], please insert:

Assignee: MOTOR WHEEL CORPORATION,
                  Lansing, MI

Signed and Sealed this

Twenty-sixth Day of November 1996

Attest:

BRUCE LEHMAN

*Attesting Officer*      *Commissioner of Patents and Trademarks*